US012453999B2

(12) United States Patent
Johnson et al.

(10) Patent No.: US 12,453,999 B2
(45) Date of Patent: Oct. 28, 2025

(54) BLIND RIVET NUT-SETTING TOOL

(71) Applicant: MILWAUKEE ELECTRIC TOOL CORPORATION, Brookfield, WI (US)

(72) Inventors: Dylan T. Johnson, Waukesha, WI (US); Jonathan G. Kriefall, Milwaukee, WI (US); Mathew R. Rentmeester, Milwaukee, WI (US); Sam L. Bertz, Fox Point, WI (US); John C. Cameron, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 103 days.

(21) Appl. No.: 17/876,135

(22) Filed: Jul. 28, 2022

(65) Prior Publication Data

US 2023/0030692 A1 Feb. 2, 2023

Related U.S. Application Data

(60) Provisional application No. 63/226,472, filed on Jul. 28, 2021.

(51) Int. Cl.
*B21J 15/26* (2006.01)
*B21J 15/10* (2006.01)
(Continued)

(52) U.S. Cl.
CPC ............. *B21J 15/26* (2013.01); *B21J 15/105* (2013.01); *B21J 15/12* (2013.01); *B21J 15/30* (2013.01); *F16D 15/00* (2013.01)

(58) Field of Classification Search
CPC ........ B21J 15/04; B21J 15/043; B21J 15/105; B21J 15/12; B21J 15/26; B21J 15/30; F16D 15/00
See application file for complete search history.

(56) References Cited

U.S. PATENT DOCUMENTS 2,423,956 A 7/1947 Amtsberg
2,723,777 A 11/1955 Amtsberg
(Continued)

FOREIGN PATENT DOCUMENTS

CN 2133383 Y 5/1993
CN 2262472 Y 9/1997
(Continued)

OTHER PUBLICATIONS

Translation of DE3432376 (Year: 1986).*
(Continued)

*Primary Examiner* — Matthew P Travers
(74) *Attorney, Agent, or Firm* — Michael Best & Friedrich LLP

(57) ABSTRACT

A blind rivet nut-setting tool for setting a rivet nut including a housing having an anvil, a pull stud for engaging the rivet nut, and an output shaft defining a drive axis. The tool includes a motor defining a motor axis. The motor is configured to transfer torque to the output shaft to rotate the pull stud about the drive axis. The tool includes a clutch mechanism that is disposed between the motor and the output shaft. The clutch mechanism is moveable between an engaged state, in which a reaction torque exerted on the pull stud is below a predefined torque threshold, and a disengaged state, in which a reaction torque exerted on the pull stud is equal to or above a predefined torque threshold. The tool includes a pull mechanism that is driven by the motor and capable of translating the pull stud along the drive axis.

23 Claims, 16 Drawing Sheets

(51) Int. Cl.
*B21J 15/12* (2006.01)
*B21J 15/30* (2006.01)
*F16D 15/00* (2006.01)

(56) References Cited

U.S. PATENT DOCUMENTS 2,753,072 A 7/1956 Mitchell
2,941,687 A 6/1960 Simmons
3,055,255 A * 9/1962 Burrell ................ F16B 19/1045 411/34
3,107,806 A 10/1963 Van Hecke et al.
3,120,845 A * 2/1964 Horner ............... A61B 17/1624 173/217
3,406,556 A 10/1968 Musser
3,548,627 A 12/1970 Henshaw
3,574,915 A 4/1971 Jeal
3,605,478 A 9/1971 Chirco
3,686,915 A 8/1972 Miller et al.
3,933,019 A 1/1976 Underland et al.
4,063,443 A 12/1977 Yarbrough
4,074,554 A 2/1978 Summerlin
4,140,000 A 2/1979 Ehmann
4,321,814 A 3/1982 Martin
4,368,631 A 1/1983 Tanikawa
4,425,782 A 1/1984 Todisco
4,559,806 A 12/1985 Schwab
4,571,976 A 2/1986 Schwab
4,574,612 A 3/1986 Tanikawa
4,612,793 A 9/1986 Klein
4,653,308 A 3/1987 Gregory
4,770,023 A 9/1988 Schwab
4,796,455 A 1/1989 Rosier
4,821,555 A 4/1989 Kamata et al.
4,864,839 A 9/1989 Schwab
4,896,522 A 1/1990 Rosier
4,979,279 A 12/1990 Garvey
5,042,131 A 8/1991 Low
5,050,420 A 9/1991 Liu
5,189,780 A 3/1993 Landes
5,208,959 A 5/1993 Rosier et al.
5,219,375 A 6/1993 Kamata et al.
5,259,713 A 11/1993 Renner et al.
5,323,946 A 6/1994 O'Connor et al.
5,361,473 A 11/1994 Landes
5,403,135 A 4/1995 Renner et al.
5,473,805 A 12/1995 Wille
5,579,641 A 12/1996 Wilcox
5,605,070 A 2/1997 Wille
5,647,209 A 7/1997 Wilcox
5,729,880 A 3/1998 Ko
6,021,553 A 2/2000 Bieber et al.
6,145,360 A 11/2000 Honsel et al.
6,212,931 B1 4/2001 Solfronk
6,276,050 B1 8/2001 Mauer et al.
6,374,474 B1 4/2002 Rössler
6,425,170 B1 7/2002 Zirps et al.
6,449,822 B1 9/2002 Gilbert et al.
6,502,008 B2 12/2002 Maurer et al.
6,622,363 B2 9/2003 Komsta
6,684,470 B1 2/2004 Joux
6,732,563 B1 5/2004 Chen
6,840,075 B2 1/2005 Neri et al.
6,886,226 B1 5/2005 Dear et al.
6,904,831 B2 6/2005 Aasgaard
7,024,270 B2 4/2006 Mauer et al.
7,032,296 B2 4/2006 Zdravkovic et al.
7,101,300 B2 9/2006 Milbourne et al.
7,123,982 B2 10/2006 Mauer et al.
7,146,715 B2 12/2006 Villanueva
7,200,914 B2 4/2007 Kaddatz
7,228,607 B1 6/2007 Liu
7,314,097 B2 1/2008 Jenner et al.
7,322,783 B2 1/2008 Pearce et al.
7,331,205 B2 2/2008 Chitty et al.
7,346,970 B2 3/2008 Stoger
7,346,971 B2 3/2008 Chitty
7,409,760 B2 8/2008 Mauer et al.
7,452,304 B2 11/2008 Hagan et al.
7,458,245 B1 12/2008 Wilcox
7,464,454 B2 12/2008 Aasgaard
7,503,196 B2 3/2009 Chitty et al.
7,559,133 B2 7/2009 Chitty et al.
7,631,534 B2 12/2009 Wilcox
7,647,680 B2 1/2010 Dear
7,752,739 B2 7/2010 Mauer et al.
7,818,859 B2 10/2010 Pearce et al.
7,900,714 B2 3/2011 Milbourne et al.
8,146,240 B2 4/2012 Mauer et al.
8,220,561 B2 7/2012 Milbourne et al.
8,251,158 B2 8/2012 Tomayko et al.
8,434,564 B2 5/2013 Tomayko et al.
8,443,512 B2 5/2013 Masugata
8,468,669 B1 * 6/2013 Lin ........................ B21J 15/043 72/391.4
8,561,275 B2 10/2013 Wille
8,631,554 B2 1/2014 Wille
8,640,315 B1 2/2014 Nikkel
8,776,338 B2 7/2014 Yuan
9,003,621 B2 4/2015 Ko
9,015,920 B2 4/2015 Mauer et al.
9,027,220 B2 5/2015 Schlafhauser
9,079,240 B2 7/2015 Schiffler et al.
9,227,313 B2 1/2016 Tseng
9,682,419 B2 6/2017 Schmidt
9,724,751 B2 8/2017 Stahl
9,833,832 B2 12/2017 Weyland et al.
9,849,502 B2 12/2017 Gaertner et al.
9,878,434 B2 1/2018 Hecht et al.
RE46,857 E 5/2018 Matsugata
9,968,988 B2 5/2018 Masugata
10,040,182 B2 8/2018 Kirilichin et al.
10,058,910 B2 8/2018 Weyland
10,112,232 B2 10/2018 Honsel
10,232,429 B1 3/2019 Lin et al.
10,270,316 B2 4/2019 Niwa
10,307,872 B2 6/2019 Simonet
10,483,901 B2 11/2019 Woyciesjes et al.
10,549,445 B2 2/2020 Myrhum, Jr. et al.
10,570,946 B2 2/2020 Linsel
10,771,004 B2 9/2020 Woyciesjes et al.
10,850,380 B2 12/2020 Huber et al.
10,859,105 B2 12/2020 Turechek et al.
2001/0003859 A1 6/2001 Mauer et al.
2004/0247412 A1 12/2004 Reck et al.
2006/0048956 A1 3/2006 Hofbrucker et al.
2008/0038085 A1 2/2008 Aasgaard
2008/0210060 A1 9/2008 Aasgaard
2010/0275424 A1 11/2010 Masugata
2010/0295696 A1 11/2010 Chu et al.
2011/0271504 A1 11/2011 Preti
2012/0030918 A1 2/2012 Desalvo et al.
2012/0111592 A1 * 5/2012 Limberg ............. B25B 23/1405 173/48
2012/0318547 A1 12/2012 Milbourne et al.
2013/0125360 A1 5/2013 Boivin et al.
2013/0161040 A1 6/2013 Tomayko et al.
2013/0205577 A1 8/2013 Soller
2013/0213680 A1 8/2013 Chen
2013/0263433 A1 10/2013 Stoian
2015/0251239 A1 9/2015 Gaertner et al.
2016/0114383 A1 4/2016 Honsel
2016/0151828 A1 6/2016 Weyland
2017/0320127 A1 11/2017 Tripp et al.
2018/0003210 A1 1/2018 Linsel
2018/0126446 A1 5/2018 Mori
2018/0318992 A1 11/2018 Kirilichin et al.
2019/0240819 A1 8/2019 Macchieraldo
2019/0283110 A1 9/2019 Kawai et al.
2019/0283111 A1 9/2019 Kawai et al.
2019/0283112 A1 9/2019 Ikuta et al.
2019/0283222 A1 * 9/2019 Thorson ................ B25B 23/141
2019/0314888 A1 10/2019 Ikuta et al.
2019/0351477 A1 11/2019 Yabuguchi et al.
2019/0375079 A1 12/2019 Kamiya

(56) References Cited

U.S. PATENT DOCUMENTS

| | | | | |
|---|---|---|---|---|
| 2020/0070327 | A1 | 3/2020 | Vollmer | |
| 2020/0122224 | A1* | 4/2020 | Wu | B21J 15/50 |
| 2020/0130047 | A1 | 4/2020 | Yabunaka et al. | |
| 2020/0139424 | A1* | 5/2020 | Yabuguchi | B21J 15/26 |
| 2020/0158157 | A1 | 5/2020 | Linsel | |
| 2020/0198167 | A1 | 6/2020 | Myrhum, Jr. et al. | |
| 2020/0238489 | A1 | 7/2020 | Mori | |
| 2021/0039234 | A1 | 2/2021 | Kirilichin et al. | |
| 2021/0069773 | A1 | 3/2021 | Yabunaka et al. | |

FOREIGN PATENT DOCUMENTS

| | | | | |
|---|---|---|---|---|
| CN | 102294426 | A | 12/2011 | |
| CN | 202726814 | U | 2/2013 | |
| CN | 203031537 | U | 7/2013 | |
| CN | 203184566 | U | 9/2013 | |
| CN | 203830638 | U | 9/2014 | |
| CN | 104148571 | A | 11/2014 | |
| CN | 204018628 | U | 12/2014 | |
| CN | 204094710 | U | 1/2015 | |
| CN | 204183494 | U | 3/2015 | |
| CN | 104550615 | A | 4/2015 | |
| CN | 104550616 | A | 4/2015 | |
| CN | 104550619 | A | 4/2015 | |
| CN | 204565044 | U | 8/2015 | |
| CN | 205324607 | U | 6/2016 | |
| CN | 104999410 | B | 3/2017 | |
| CN | 206028637 | U | 3/2017 | |
| CN | 106670373 | A | 5/2017 | |
| CN | 106799451 | A | 6/2017 | |
| CN | 107559286 | A | 1/2018 | |
| CN | 207563672 | U | 7/2018 | |
| CN | 109909430 | A | 6/2019 | |
| CN | 210576957 | U | 5/2020 | |
| CN | 105589414 | B | 1/2021 | |
| DE | 7206720 | U | 11/1972 | |
| DE | 2320080 | C3 | 8/1981 | |
| DE | 2417646 | C2 | 4/1985 | |
| DE | 3432376 | A1 * | 3/1986 | B25B 23/141 |
| DE | 3306827 | C2 | 5/1986 | |
| DE | 3532932 | A1 | 3/1987 | |
| DE | 3603421 | A1 | 8/1987 | |
| DE | 3308915 | C2 | 9/1987 | |
| DE | 4100709 | A1 | 7/1992 | |
| DE | 9207634 | U1 | 8/1992 | |
| DE | 9300118 | U1 | 2/1993 | |
| DE | 9406626 | U1 | 6/1994 | |
| DE | 4406946 | A1 | 9/1995 | |
| DE | 3400942 | C2 | 11/1995 | |
| DE | 29502918 | U1 | 6/1996 | |
| DE | 19502855 | C2 | 11/1997 | |
| DE | 29902826 | U1 | 6/1999 | |
| DE | 3701883 | C2 | 9/1999 | |
| DE | 19809354 | A1 | 9/1999 | |
| DE | 19819251 | A1 | 11/1999 | |
| DE | 29900048 | U1 | 6/2000 | |
| DE | 19902858 | A1 | 7/2000 | |
| DE | 20013585 | U1 | 12/2000 | |
| DE | 29914202 | U1 | 12/2000 | |
| DE | 10130681 | A1 | 1/2003 | |
| DE | 20023264 | U1 | 7/2003 | |
| DE | 10325851 | A1 | 12/2004 | |
| DE | 102005022748 | A1 | 11/2006 | |
| DE | 102005053221 | A1 | 5/2007 | |
| DE | 102005054048 | A1 | 5/2007 | |
| DE | 10342143 | B4 | 7/2007 | |
| DE | 202008003684 | U1 | 7/2008 | |
| DE | 102008013044 | B3 | 7/2009 | |
| DE | 102010024610 | A1 | 12/2010 | |
| DE | 202011005601 | U1 | 7/2011 | |
| DE | 102010022022 | A1 | 12/2011 | |
| DE | 102010035613 | A1 | 3/2012 | |
| DE | 102012216838 | A1 | 6/2014 | |
| DE | 102013008653 | A1 | 11/2014 | |
| DE | 102013208288 | A1 | 11/2014 | |
| DE | 102014207340 | A1 | 11/2014 | |
| DE | 102013105703 | A1 | 12/2014 | |
| DE | 102013221789 | A1 | 4/2015 | |
| DE | 102013221790 | A1 | 5/2015 | |
| DE | 102014223034 | A1 | 5/2016 | |
| DE | 102014117401 | A1 | 6/2016 | |
| DE | 102015103277 | A1 | 9/2016 | |
| DE | 102015116559 | A1 | 3/2017 | |
| DE | 102015216360 | A1 | 3/2017 | |
| DE | 102015119571 | A1 | 5/2017 | |
| DE | 102015221476 | A1 | 5/2017 | |
| DE | 102016209749 | A1 | 12/2017 | |
| DE | 102017209844 | A1 | 1/2018 | |
| DE | 102017219712 | A1 | 5/2019 | |
| DE | 102017223713 | A1 | 6/2019 | |
| DE | 102018207443 | A1 | 11/2019 | |
| DE | 202020101120 | U1 | 3/2020 | |
| DE | 102019107380 | A1 | 9/2020 | |
| EP | 0043216 | A1 | 1/1982 | |
| EP | 0043217 | A1 | 1/1982 | |
| EP | 0081345 | A1 | 6/1983 | |
| EP | 0119007 | A2 | 9/1984 | |
| EP | 0120309 | A2 | 10/1984 | |
| EP | 0027663 | B1 | 2/1985 | |
| EP | 0302136 | A1 | 2/1989 | |
| EP | 0325669 | A1 | 8/1989 | |
| EP | 0259405 | B1 | 1/1991 | |
| EP | 0456852 | A1 | 11/1991 | |
| EP | 0494747 | A1 | 7/1992 | |
| EP | 0236464 | B1 | 12/1992 | |
| EP | 0670199 | A1 | 9/1995 | |
| EP | 0807007 | B1 | 12/1999 | |
| EP | 1018407 | A2 | 7/2000 | |
| EP | 1503089 | A1 | 2/2005 | |
| EP | 0927585 | B1 | 4/2006 | |
| EP | 1258321 | B1 | 7/2007 | |
| EP | 1707848 | B1 | 8/2008 | |
| EP | 2093024 | A1 | 8/2009 | |
| EP | 1089839 | B1 | 12/2009 | |
| EP | 2390059 | A2 | 11/2011 | |
| EP | 2399712 | A2 | 12/2011 | |
| EP | 2402095 | A1 | 1/2012 | |
| EP | 2786843 | A2 | 10/2014 | |
| EP | 2827006 | A1 | 1/2015 | |
| EP | 2409814 | B1 | 3/2015 | |
| EP | 2910321 | A1 | 8/2015 | |
| EP | 2918357 | A1 | 9/2015 | |
| EP | 2626154 | B1 | 12/2015 | |
| EP | 2985094 | A1 | 2/2016 | |
| EP | 2862676 | B1 | 6/2016 | |
| EP | 3025807 | A1 | 6/2016 | |
| EP | 2608909 | B1 | 11/2016 | |
| EP | 3159112 | A2 | 4/2017 | |
| EP | 3167973 | A1 | 5/2017 | |
| EP | 3202536 | A1 * | 8/2017 | B21J 15/24 |
| EP | 3263921 | A1 | 1/2018 | |
| EP | 3067157 | B1 | 4/2018 | |
| EP | 3342506 | A1 | 7/2018 | |
| EP | 3181260 | B1 | 9/2019 | |
| GB | 1457326 | A | 12/1976 | |
| JP | 2000190246 | A | 7/2000 | |
| JP | 2018144953 | A | 9/2018 | |
| WO | WO8704647 | A1 | 8/1987 | |
| WO | WO9965630 | A1 | 12/1999 | |
| WO | WO0236282 | A1 | 5/2002 | |
| WO | WO0243898 | A2 | 6/2002 | |
| WO | WO2009072836 | A2 | 6/2009 | |
| WO | WO 2012025102 | A2 | 3/2012 | |
| WO | WO2013180769 | A1 | 12/2013 | |
| WO | WO 2014195189 | A1 | 12/2014 | |
| WO | WO2016050121 | A1 | 4/2016 | |
| WO | WO2016086844 | A1 | 6/2016 | |
| WO | WO2018139372 | A1 | 8/2018 | |
| WO | WO2019049910 | A1 | 3/2019 | |
| WO | WO2019054257 | A1 | 3/2019 | |
| WO | WO2020016288 | A1 | 1/2020 | |
| WO | WO2020233914 | A1 | 11/2020 | |

(56) References Cited

FOREIGN PATENT DOCUMENTS

| | | | |
|---|---|---|---|
| WO | WO2020245310 | A1 | 12/2020 |
| WO | WO2021017548 | A1 | 2/2021 |

OTHER PUBLICATIONS

International Search Report and Written Opinion for Application No. PCT/US2022/038687 dated Nov. 23, 2022 (13 pages).
European Patent Office Extended Search Report for Application No. 19195370.2 dated Jun. 3, 2020 (8 pages).

* cited by examiner

BLIND RIVET NUT-SETTING TOOL

CROSS-REFERENCE TO RELATED APPLICATIONS

This application claims priority to U.S. Provisional Patent Application No. 63/226,472 filed on Jul. 28, 2021, the entire content of which is incorporated herein by reference.

FIELD OF THE INVENTION

The present invention relates to blind rivet nut-setting tools, and more particularly to powered blind rivet nut-setting tools.

BACKGROUND OF THE INVENTION

Powered blind rivet nut-setting tools rotate an output shaft to thread the output shaft into a blind rivet nut. After the output shaft is threaded into the blind rivet nut, the output shaft performs a setting stroke to set the blind rivet nut on a workpiece.

SUMMARY OF THE INVENTION

The present invention provides, in one aspect, a blind rivet nut-setting tool for setting a rivet nut. The tool includes a housing having an anvil, a pull stud extending from the anvil and capable of engaging the rivet nut, and an output shaft defining a drive axis. The tool further includes a motor having a drive shaft defining a motor axis. The motor is configured to transfer torque to the output shaft to rotate the pull stud about the drive axis. The tool further includes a clutch mechanism that is disposed between the motor and the output shaft. The clutch mechanism is moveable between an engaged state, in which torque from the motor is transferred to the output shaft when a reaction torque exerted on the pull stud is below a predefined torque threshold, and a disengaged state, in which torque from the motor is not transferred to the output shaft when a reaction torque exerted on the pull stud is equal to or above a predefined torque threshold. The tool further includes a pull mechanism that is driven by the motor and capable of translating the pull stud along the drive axis.

The present invention provides, in another aspect, a blind rivet nut-setting tool for setting a rivet nut. The tool includes a housing having an anvil, a pull stud extending from the anvil and capable of engaging the rivet nut, an output shaft defining a drive axis, and a motor having a drive shaft defining a motor axis. The motor is configured to transfer torque to the output shaft to rotate the pull stud about the drive axis. The tool further includes a clutch mechanism that is disposed between the motor and the output shaft. The clutch mechanism is capable of disengaging when the motor is driven in a forward direction in response to a first reaction torque being exerted on the pull stud, such that the drive shaft is capable of rotating relative to the output shaft in response to the rivet nut being seated against the anvil. The clutch mechanism is engaged when the motor is driven in a reverse direction to unthread the pull stud from the rivet nut until a second reaction torque is exerted on the pull stud that is greater than the first reaction torque.

The present invention provides, in another aspect, a blind rivet nut-setting tool including an output shaft configured to actuate along a drive axis, an input device configured to adjust an operating mode of the power tool, a distance-setting device configured to set an amount of actuation of the output shaft, and a motor coupled to the output shaft. The motor has a stator and a rotor that rotates about a motor axis. The tool further includes a position sensor configured to detect a position of the rotor; and a controller coupled to the input device. The distance-setting device, the motor, the position sensor, and the controller are configured to receive, from the input device, an input indicative of the operating mode of the power tool, determine the power tool is operating in a distance-based operating mode, determine a value of the distance-setting device, determine a distance to pull a rivet nut coupled to the output shaft based on the value of the distance-setting device, operate the motor to actuate the output shaft, determine, based on the position of the rotor, a number of rotations of the rotor, compare the number of rotations of the rotor to a rotation threshold that corresponds to the distance to pull the rivet nut, and stop, in response to the number of rotations of the rotor being greater than or equal to the rotation threshold, operation of the motor.

The present invention provides, in yet another aspect, a power tool including an output shaft configured to actuate along a drive axis, an input device configured to adjust an operating mode of the power tool, and a motor coupled to the output shaft. The motor includes a stator and a rotor that rotates about a motor axis. The tool further includes a current sensor configured to detect a current of the motor and a controller coupled to the input device. The motor, the current sensor, and the controller are configured to receive, from the input device, an input indicative of the operating mode of the power tool, determine the power tool is operating in a force-based operating mode, operate the motor to actuate the output shaft, determine a derivative of the current of the motor, compare the derivative of the current of the motor to a current threshold, and stop, in response to the derivative of the current of the motor being greater than or equal to the current threshold, operation of the motor.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
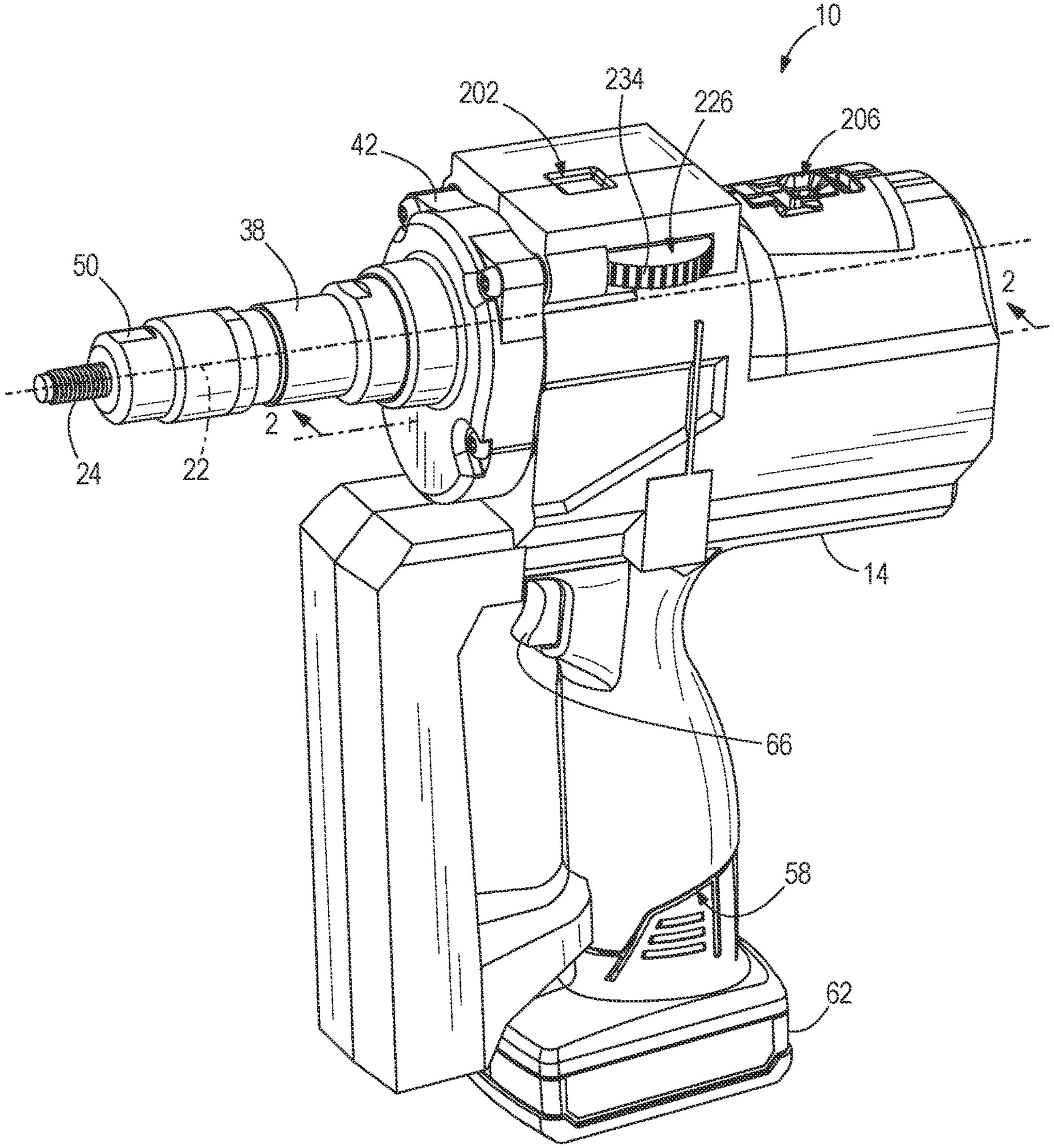
FIG. 1 is a perspective view of a blind rivet nut-setting tool.
Figure 2:
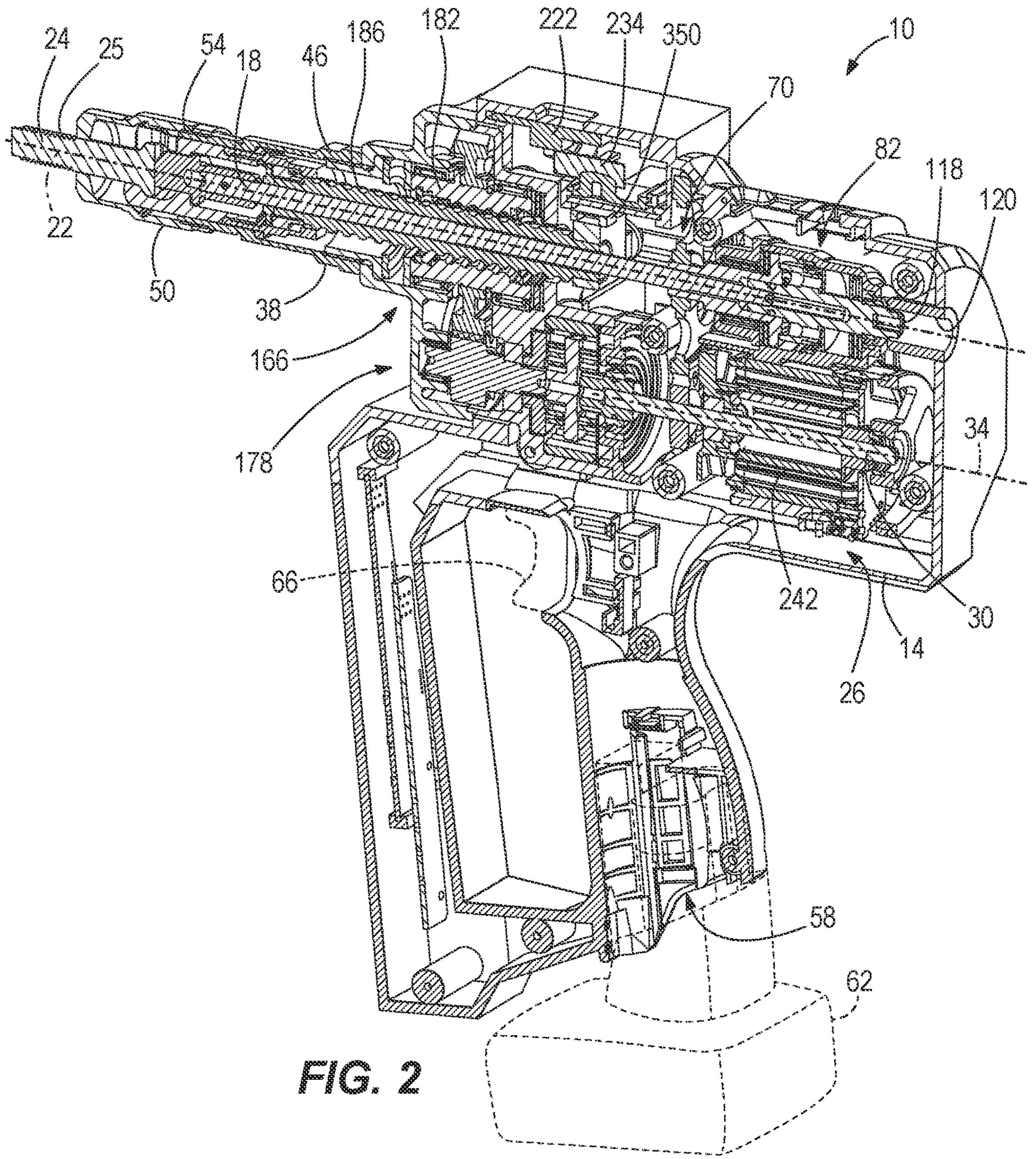
FIG. 2 is a perspective cross-sectional view of the blind rivet nut-setting tool along line 2-2 of FIG. 1.
Figure 3:
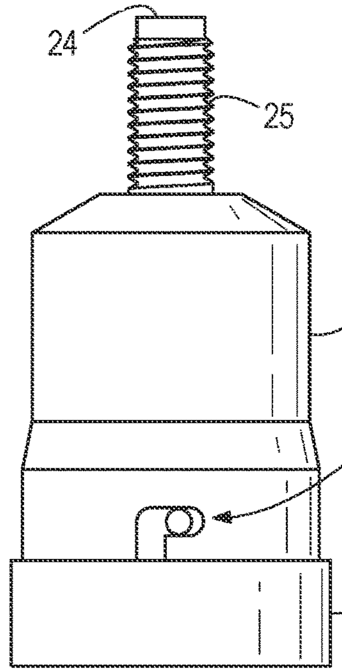
FIG. 3 is an enlarged side view of an anvil in accordance with another embodiment of the blind rivet nut-setting tool.

As shown in FIGS. 1 and 2, a blind rivet nut-setting tool 10 includes a housing 14, an output shaft 18 defining a drive axis 22, a pull stud 24 having threads 25, and a motor 26 having a drive shaft 30 for rotating the output shaft 18 about the drive axis 22. The drive shaft 30 of the motor 26 is driven about a motor axis 34. The motor axis 34 and the drive axis 22 are parallel to each other. The housing 14 includes a front piece 38 that is threaded onto a main body 42 of the housing 14 via threads 46. An anvil 50 is threaded into the front piece 38 via threads 54, while in other embodiments, the anvil 50 is coupled to the front piece 38, for example, via a bayonet quick connect mechanism 56 (FIG. 3). The housing 14 also includes a battery pack interface 58 (FIG. 2) for receiving a battery pack 62 (FIG. 1) to power the motor 26 and a trigger 66 for activating the motor 26 to initiate a threading and setting sequence, as explained in further detail below.

Figure 4:
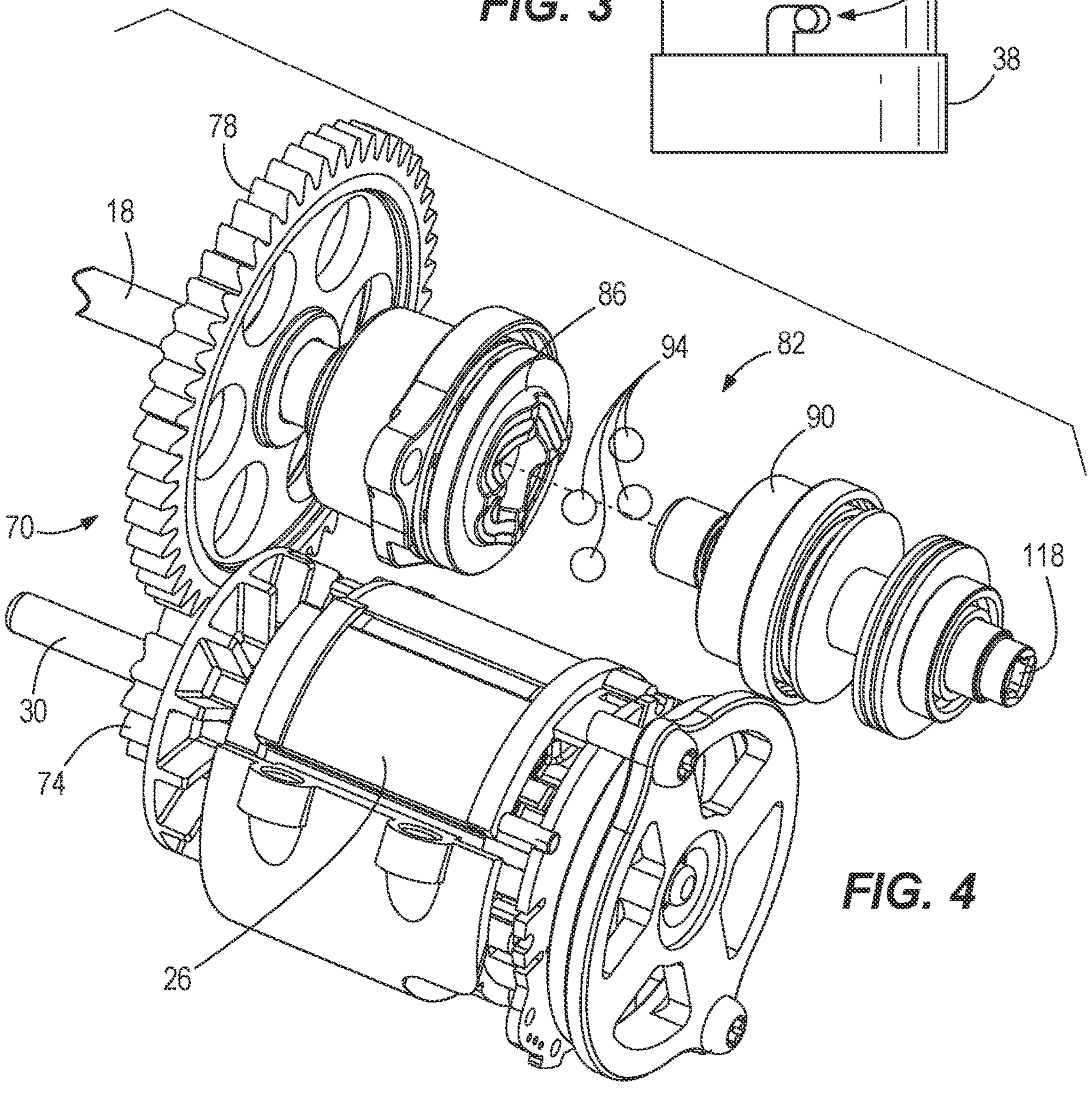
FIG. 4 is a partially exploded perspective view of a drive unit of the blind rivet nut-setting tool of FIG. 1, with portions removed.

With reference to FIG. 4, the motor 26 transmits torque through a transmission 70, which transfers rotational force to the output shaft 18. The transmission 70 includes a first spur gear 74 that is coupled to the drive shaft 30 and a second spur gear 78 that is intermeshed and driven by the first spur gear 74. Disposed between the transmission 70 and the output shaft 18 is a clutch mechanism 82. The clutch mechanism 82 is capable of selectively transferring torque from the transmission 70 to the output shaft 18 and disengages when a reaction torque exerted on the clutch mechanism 82 exceeds a predetermined torque threshold.

With continued reference to FIG. 4, the illustrated clutch mechanism 82 is a ball and ramp clutch design. The clutch mechanism 82 includes a slip plate 86 that is coupled for co-rotation with the second spur gear 78 of the transmission 70, a clutch sleeve 90 that is coupled for co-rotation with the output shaft 18, and a plurality of balls 94 disposed therebetween to selectively engage the slip plate 86 and the clutch sleeve 90 for co-rotation. The plurality of balls 94 are biased towards the slip plate 86. In other embodiments, the clutch sleeve 90 is coupled for co-rotation with the second spur gear 78 and the slip plate 86 is coupled for co-rotation with the output shaft 18.

Figure 5:
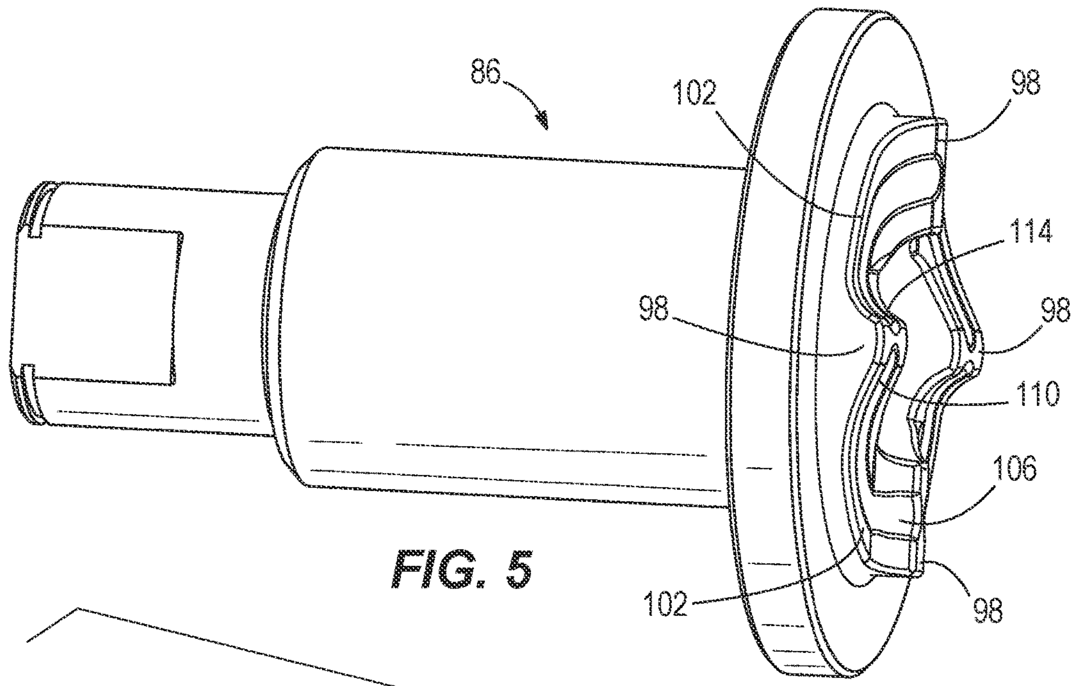
FIG. 5 is a perspective view of a portion of a clutch mechanism of the blind rivet nut-setting tool of FIG. 1.

With reference to FIG. 5, the slip plate 86 includes ramps 98 that extend away from the slip plate 86 along a direction parallel to the drive axis 22 and troughs 102 disposed between the ramps 98. Extending along the ramps 98 and the troughs 102 is a groove 106, in which the plurality of balls 94 roll through between the ramps 98 and the troughs 102. Each ramp 98 is composed of a gradual slope section 110 and a steep slope section 114. The steep slope section 114 has a steeper slope angle than the gradual slope section 110. The balls 94 are permitted to roll up the gradual slope section 110 and the steep slope section 114 but a greater reaction torque exerted on the pull stud 24 is required for the balls 94 to roll up the steep slope section 114. That said, the balls 94 are capable of rolling up the gradual slope section 110 and capable of rolling down the steep slope section 114 in response to a first reaction torque being exerted on the pull stud 24 when the motor 26 is driven in the forward direction. Similarly, the balls 94 jam against the steep slope section 114 when the motor 26 is driven in the reverse direction until a second reaction torque is exerted on the pull stud 24 that is greater than the first reaction torque, at which point the balls 94 are capable of rolling up the steep slope section 114 and down the gradual slope section 110.

Figure 6:
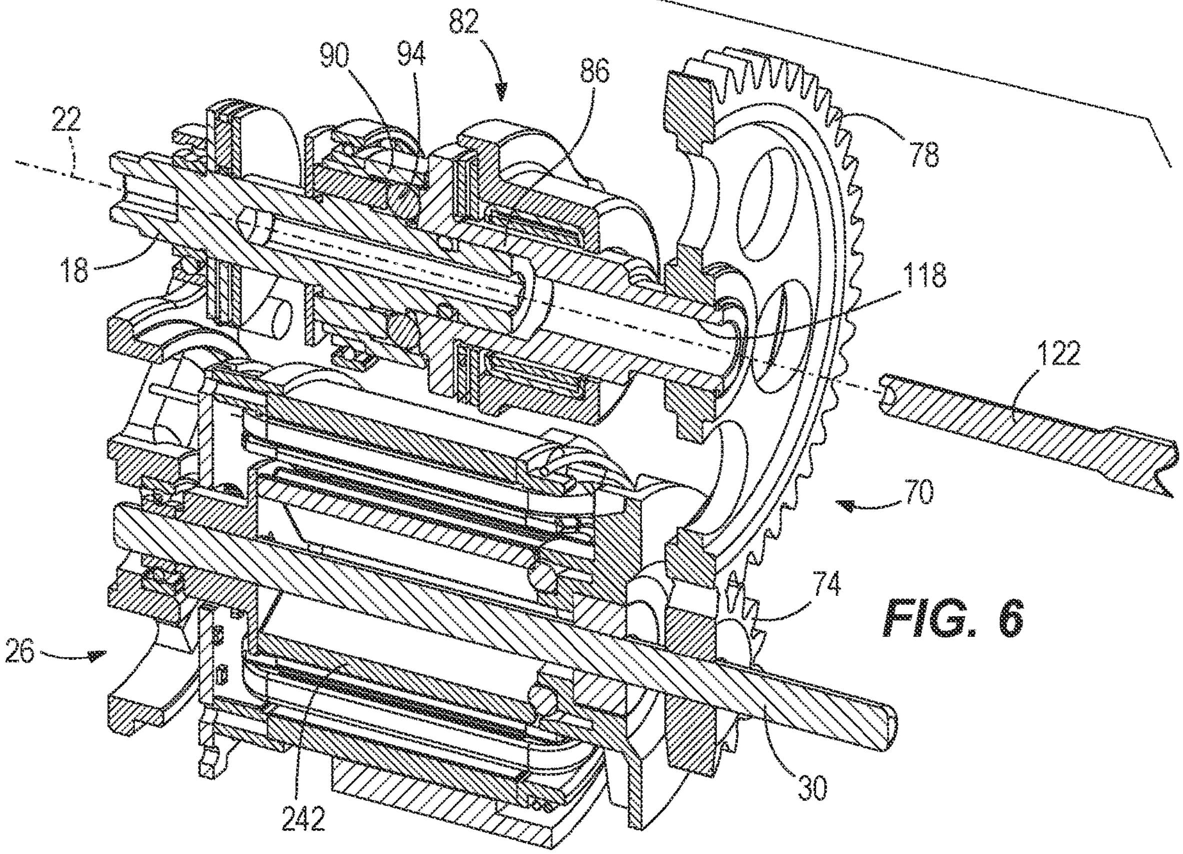
FIG. 6 is a perspective cross-sectional view of the clutch mechanism of the blind rivet nut-setting tool along line 2-2 of FIG. 1.

With reference to FIG. 6, the clutch mechanism 82 also includes a clutch bypass 118, which is accessible through an aperture 120 (FIG. 2) in the tool 10. Specifically, a key 122 (e.g., square drive, hex drive, spline drive, etc.) is inserted through the aperture and into the clutch bypass 118 (FIG. 6). Once the key 122 is inserted into the clutch bypass 118, the key 122 couples directly to the output shaft 18, where a user can manually rotate the key 122 to rotate the pull stud 24.

In operation, the clutch mechanism 82 is driven by the motor 26 and the transmission 70 when the trigger 66 is actuated. In an engaged state, the clutch mechanism 82 transfers torque from the transmission 70 to the output shaft 18 when a reaction torque exerted on the pull stud 24 is less than the predetermined torque threshold. In a disengaged state, the clutch mechanism 82 disengages (e.g., slips, actuates, etc.), such that the slip plate 86 rotates relative to the clutch sleeve 90 when a reaction torque exerted on the pull stud 24 is greater than the predetermined torque threshold. Therefore, the pull stud 24 does not rotate when the clutch mechanism 82 is in the disengaged state. When the motor 26 is driven in a reverse direction, the slip plate 86 rotates in an opposite direction relative to the clutch sleeve 90 and the plurality of balls 94. Here, the balls 94 jam against the steep slope section 114 of the slip plate 86, such that the balls 94 are inhibited from traveling up the ramps 98. Thus, the slip plate 86 and the clutch sleeve 90 remain in an engaged state when the motor 26 is driven in a reverse direction until the reaction torque on the pull stud 24 is sufficient to slide the balls 94 up the steep slope section 114, which requires more reaction torque than simply sliding the balls 94 up the gradual slope section 110. Alternatively, a user can insert the key 122 into the clutch bypass 118 and manually rotate the key 122 to rotate the pull stud 24 without activating the motor 26.

Figure 7:
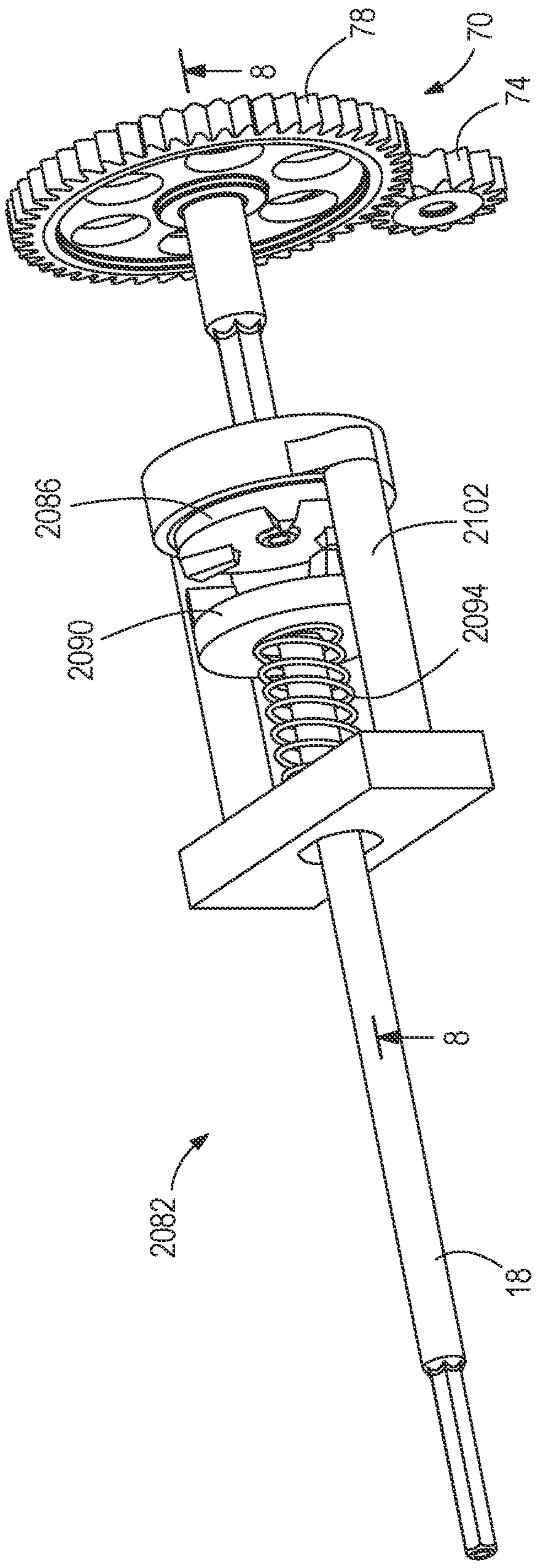
FIG. 7 is a perspective view of a clutch mechanism in accordance with yet another embodiment of the blind rivet nut-setting tool.
Figure 8:
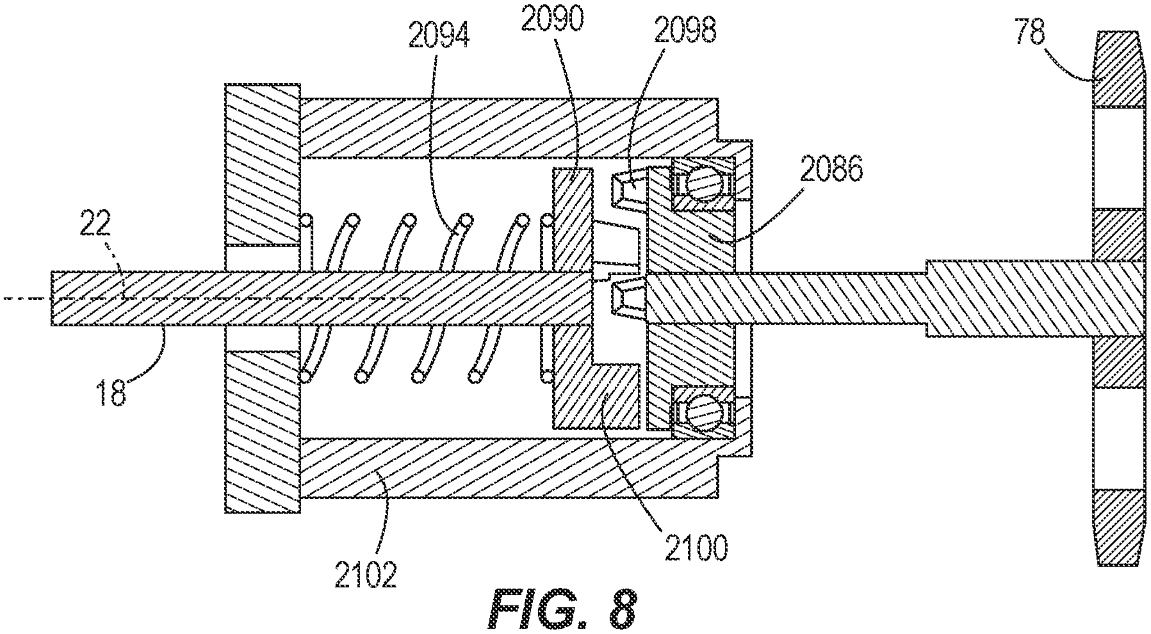
FIG. 8 is a cross-sectional view of the clutch mechanism along line 8-8 of FIG. 10, illustrating the clutch mechanism in an engaged position.
Figure 9:
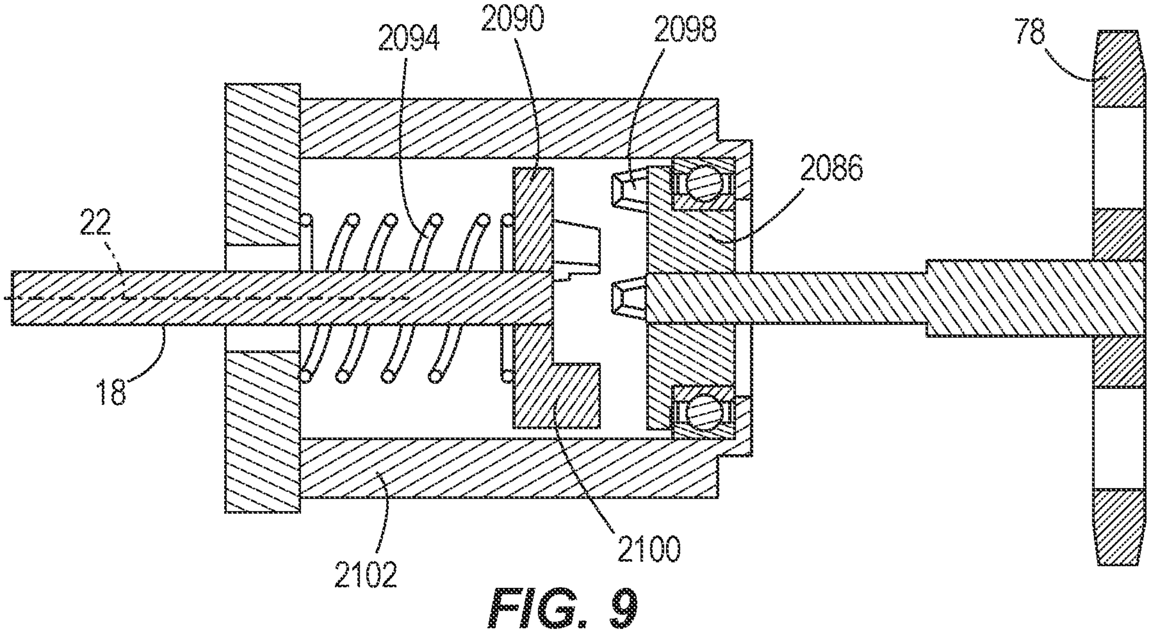
FIG. 9 is a cross-sectional view of the clutch mechanism along line 8-8 of FIG. 10, illustrating the clutch mechanism in a disengaged state.

In another embodiment, the clutch mechanism 2082 is a different type of spring clutch design, as shown in FIGS. 7-9. The clutch mechanism 2082 includes a driver clutch plate 2086 that is coupled for co-rotation with the second spur gear 78, a follower clutch plate 2090 that is coupled for co-rotation with the output shaft 18, and a compression spring 2094 that biases the follower clutch plate 2090 into engagement with the driver clutch plate 2086. The driver clutch plate 2086 is axially translatable along a shaft of the second spur gear 78, whereas the follower clutch plate 2090 is axially fixed to the output shaft 18. When the reaction torque exerted on the pull stud 24 exceeds the predetermined torque value, the driver clutch plate 2086 translates away from the follower clutch plate 2090 against the bias of the compression spring 2094. Thus, the clutch mechanism 2082 is moveable between an engaged state (FIG. 8), in which torque is transferred from the motor 26 to the output shaft 18, and a disengaged state (FIG. 9), in which torque is inhibited from being transferred from the motor 26 to the output shaft 18. In the engaged state, respective tabs 2098, 2100 engage to transmit torque between the driver clutch plate 2086 and the follower clutch plate 2090.

The clutch mechanism 2082 further includes a clutch housing 2102 that receives the driver clutch plate 2086 and the follower clutch plate 2090. The clutch housing 2102 is disposed within the blind rivet nut-setting tool 10 and capable of being translated rearwardly along the drive axis 22 in response to a forward load being exerted on the pull stud 24. As the forward load is applied to the pull stud 24, the driver clutch plate 2086 and the follower clutch plate 2090 separate because the follower clutch plate 2090 is axially fixed to the output shaft 18, thereby inhibiting rotation of the output shaft 18.

Figure 10:
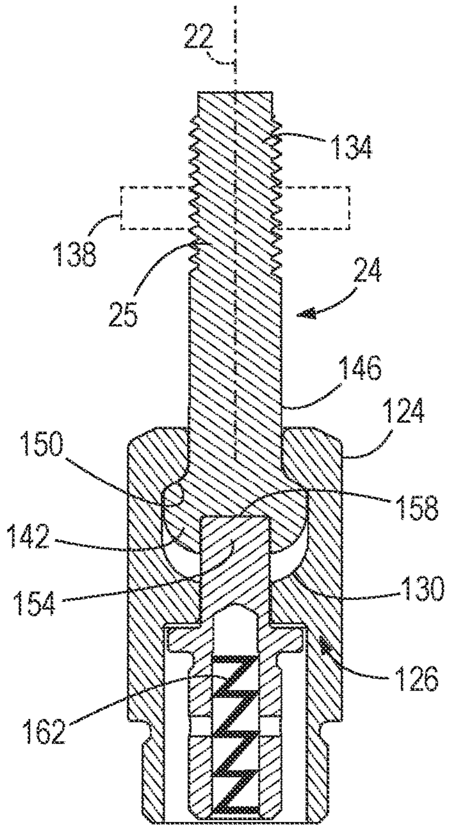
FIG. 10 is a cross-sectional view of a pull stud of the blind rivet nut-setting tool of FIG. 1.
Figure 11:
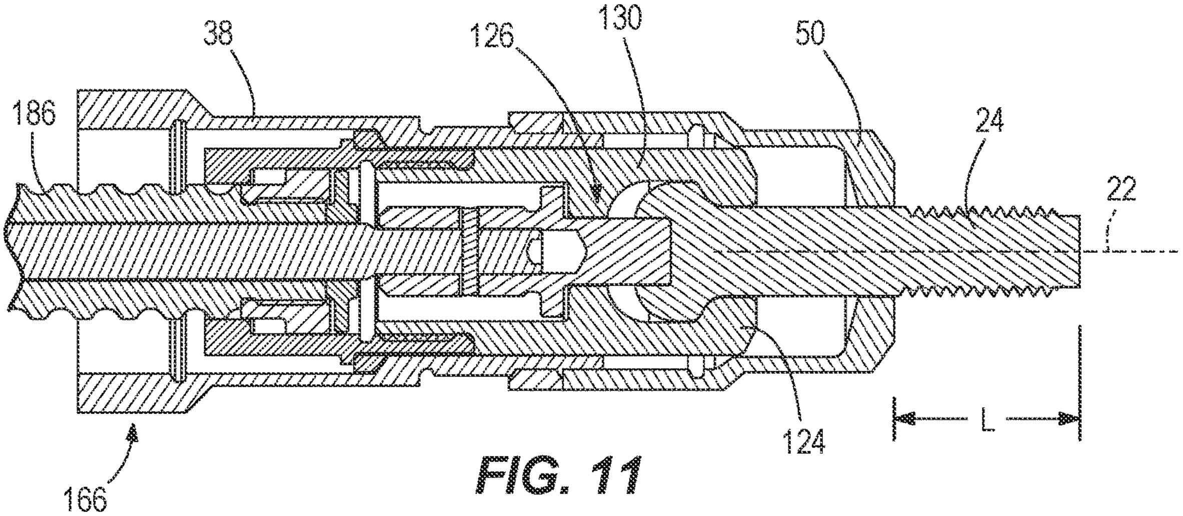
FIG. 11 is a cross-sectional view of a pull mechanism of the blind rivet nut-setting tool of the FIG. 1.

With reference to FIG. 10, the pull stud 24 is removably coupled to a receiver 124 via a quick-disconnect mechanism 126. Specifically, the pull stud 24 is coupled within a port 130 of the receiver 124, where the quick-disconnect mechanism 126 locks the pull stud 24 to the port 130. The receiver 124 is disposed within the anvil 50, as shown in FIG. 11. When the pull stud 24 is received within the port 130 and engaged with the quick-disconnect mechanism 126, the pull stud 24 is inhibited from translating axially relative to the receiver 124 and also inhibited from rotating relative to the receiver 124.

The pull stud 24 includes a shaft 134 with the threads 25 that are capable of engaging a rivet nut 138, an enlarged head 142, and a neck 146 between the threads 25 and the enlarged head 142. The enlarged head 142 and at least a portion of the neck 146 is received within the port 130. The enlarged head 142 engages a shoulder 150 in the port 130 to inhibit the pull stud 24 from being moved axially along the drive axis 22. The quick-disconnect mechanism 126, on the other hand, engages the enlarged head 142 to inhibit the pull stud 24 from being moved in a direction perpendicular to the drive axis 22. Also, the quick-disconnect mechanism 126 includes a latch 154 that engages a notch 158 in the enlarged head 142 to inhibit rotation of the pull stud 24 about the drive axis 22. The latch 154 is biased towards an extended position via spring 162, so that the latch 154 remains in the notch 158. To remove the pull stud 24 from the receiver 124, a user pushes down the pull stud 24 against the bias of the spring 162 to move the latch 154 to a retracted position, and then pulls the pull stud 24 laterally out of the port 130 along a direction that is perpendicular to the drive axis 22. At this point, the pull stud 24 disengages the quick-disconnect mechanism 126. No tool is required to remove or insert the pull stud 24.

With reference to FIGS. 2 and 11, the rivet nut-setting tool 10 further includes a pull mechanism 166 that is capable of axially translating the pull stud 24 along the drive axis 22. In the illustrated embodiment, a protrusion length L of the pull stud 24 that extends beyond the front of the anvil 50 can also be adjusted via the pull mechanism 166. The pull mechanism 166 moves the pull stud 24 electronically relative to the front of the anvil 50 to adjust the protrusion length L, as shown in FIG. 11. Here, the motor 26 drives a multi-stage planetary transmission 178 (FIG. 2) to transmit torque from the motor 26 to a collar 182. The pull mechanism 166 further includes a ball screw 186 that is coupled to the collar 182 (FIGS. 2 and 11). Specifically, the collar 182 circumferentially surrounds the ball screw 186 and engages the ball screw 186. When the collar 182 is rotated via the motor 26 (and the planetary transmission 178), the ball screw 186 translates within the tool 10 along the drive axis 22. The ball screw 186 is coupled to the pull stud 24 via the receiver 124, such that axial movement of the ball screw 186 correlates to axial movement of the pull stud 24 along the drive axis 22. To determine when to stop or when the protrusion length L is reached, the pull mechanism 166 may include a Hall-effect sensor(s) 350 (FIG. 2). A user interface module 190, as described in further detail below, is provided on the tool 10 to adjust the protrusion length L of the pull stud 24.

Figure 12:
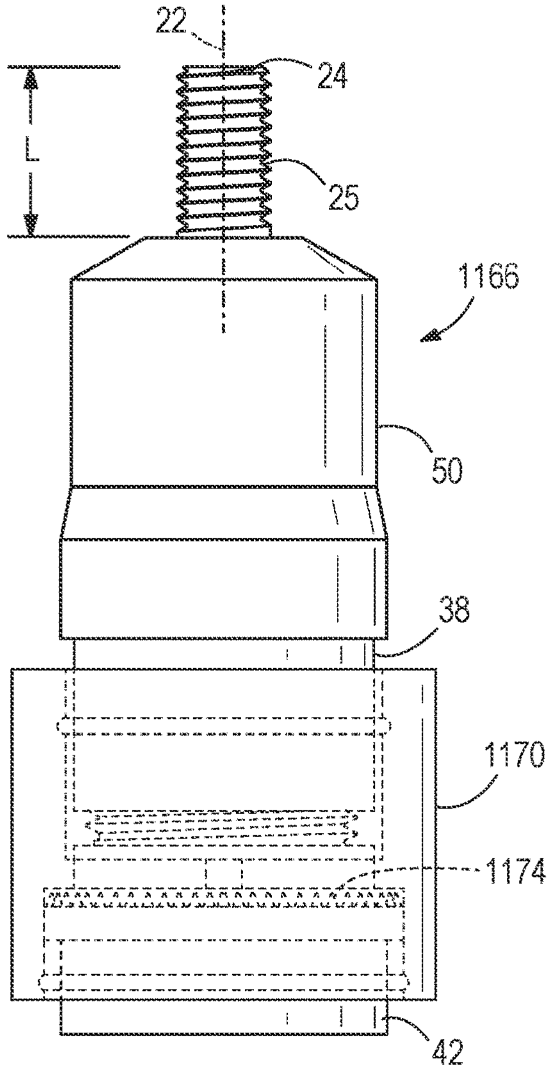
FIG. 12 is a side view of a pull stud adjustment mechanism in accordance with an embodiment of the blind rivet nut-setting tool.

In some embodiments, a pull stud adjustment mechanism 1166 moves the anvil 50 mechanically relative to the pull stud 24 to adjust the protrusion length L, as shown in FIG. 12. Here, the anvil 50 is fixed for rotation together with the front piece 38. A collet 1170 is biased along the drive axis 22 toward a home position, in which teeth 1174 lock the collet 1170 with the main body 42. When the collet 1170 is urged against the biasing force toward a work position, the collet 1170 disengages from the teeth 1174 and interlocks with the front piece 38 such that the collet 1170, the front piece 38, and the anvil 50 co-rotate. The front piece 38 and anvil 50 translate along the drive axis 22 when rotated (via a threaded arrangement with the main body 42) to adjust the axial position of the anvil 50. Thus, when a user moves the collet 1170 away from the home position, the teeth 1174 are unlocked and rotation of the collet 1170 causes rotation of the anvil 50 so a user can set the desired position of the anvil 50 to change the protrusion length L of the pull stud 24.

Figure 13:
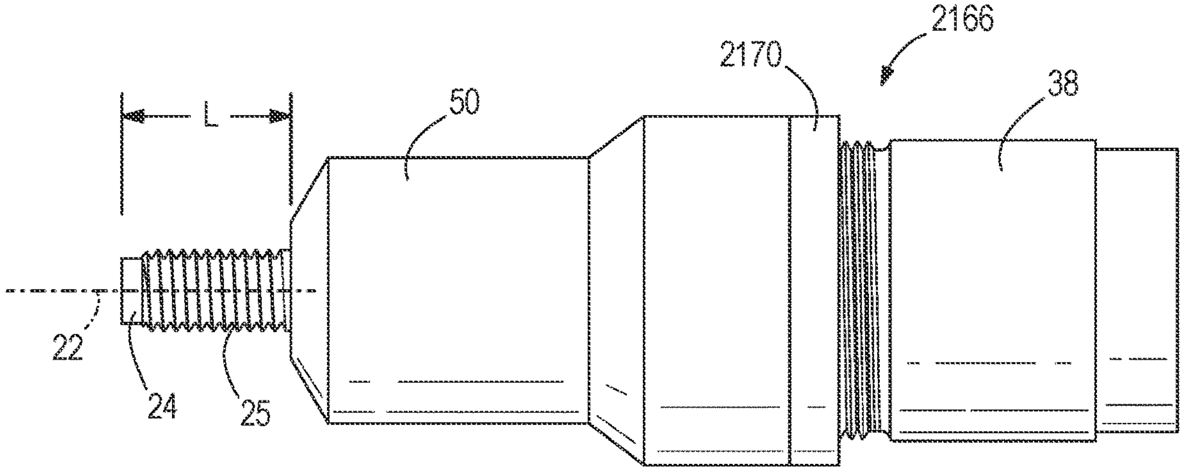
FIG. 13 is a side view of a pull stud adjustment mechanism in accordance with another embodiment of the blind rivet nut-setting tool.

Still, in some embodiment, a pull stud adjustment mechanism 2166 moves the anvil 50 mechanically relative to the pull stud 24 to adjust the protrusion length L, as shown in FIG. 13. The pull stud adjustment mechanism 2166 includes a jam nut 2170 that is threaded onto the front piece 38. The jam nut 2170 is axially adjustable along the drive axis 22 by rotation. The anvil 50 is also threaded onto the front piece 38 and can be removed from the front piece 38. At this point, a user adjusts the jam nut 2170 by rotation and then screws the anvil 50 back onto the front piece 38 until the anvil 50 abuts the jam nut 2170 at the desired axial location. Adjusting the anvil 50 changes the protrusion length L of the pull stud 24.

Figure 14:
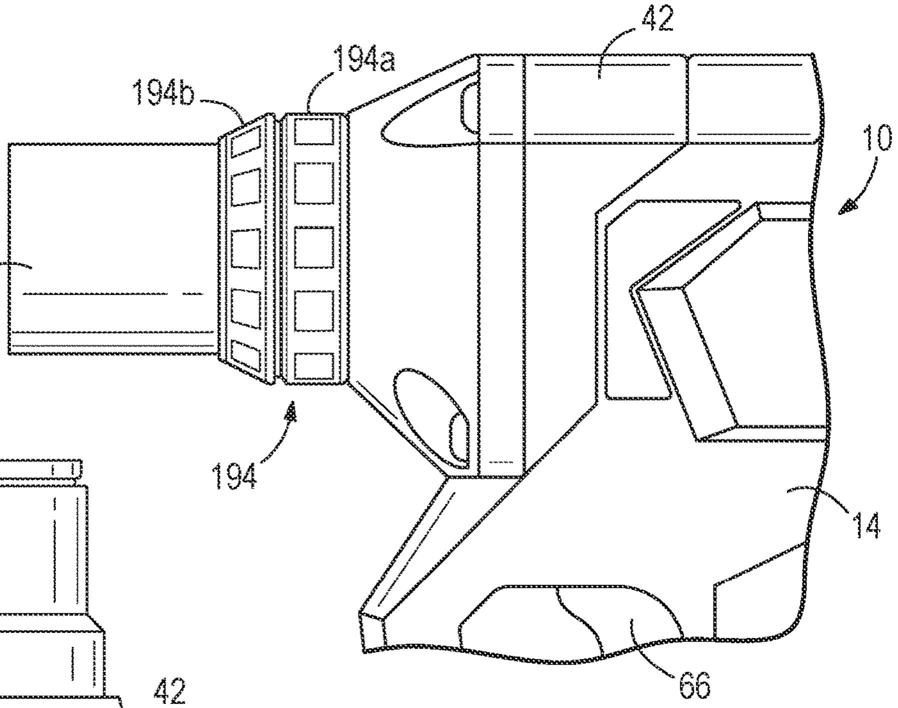
FIG. 14 is a side view of the blind rivet nut-setting tool in accordance with another embodiment, illustrating dual input rings for setting an output parameter of the tool.

With reference to FIG. 14, in some embodiments of the blind rivet nut-setting tool 10 there may be a dual (i.e., two) ring input 194 that can be used for setting an output parameter of the tool 10. A first ring 194*a* controls the parameter in intervals of 10 (e.g., 10, 20, 30 . . . 90), while a second ring 194*b* controls the parameter in intervals of 1 (e.g., 1, 2, 3 . . . 9). The first ring 194*a* and the second ring 194*b* produce analog or digital signals that are added together via a controller 300 to provide the setting value for the parameter. As a result, the dual ring input 194 configuration allows a user to set a value for a parameter between 0 and 99. The output parameter may be a clutch setting, a power setting, a pull force setting, or some other similar type of output parameter. Optionally, a setting value of "0" can correspond to a lock setting for the tool 10.

Figure 15:
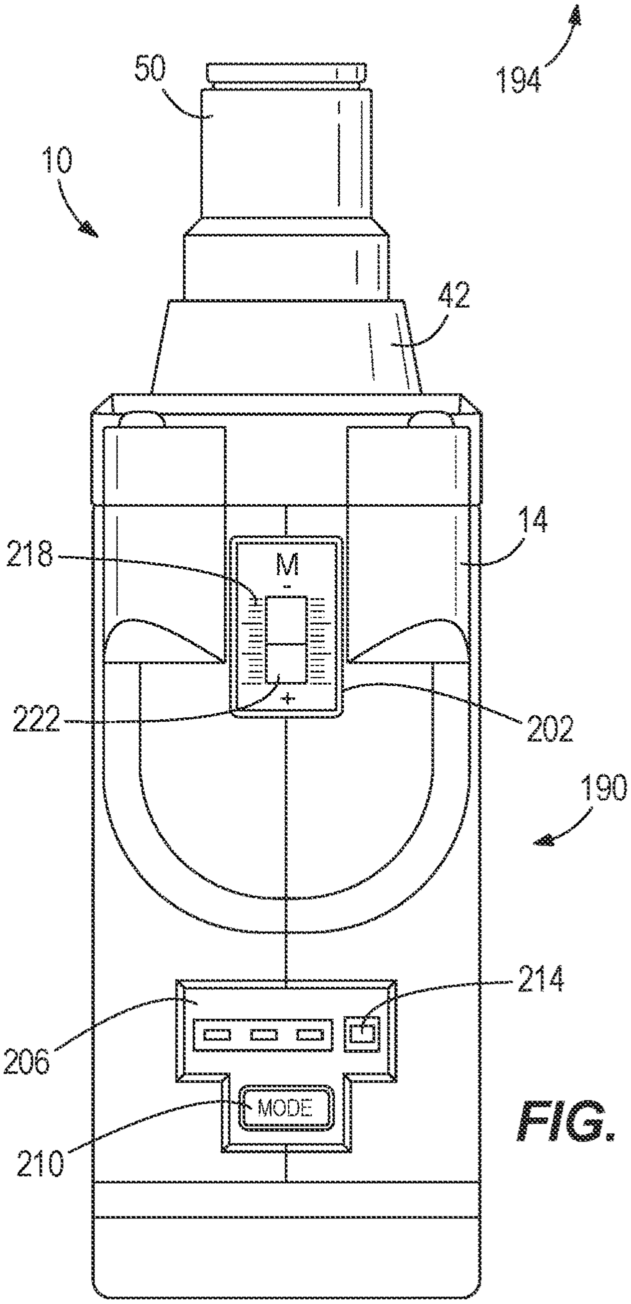
FIG. 15 is a top view of a power tool in accordance with an embodiment described herein.

With reference to FIG. 15, the rivet nut-setting tool 10 includes the user interface module 190, a distance interface 202, an operation mode interface 206, and a mode selection input 210. The operation mode interface 206 provides a plurality of operating modes in which the rivet nut-setting tool 10 may operate, such as a distance-based operating mode and a force-based operating mode. In the illustrated embodiment, the operation mode interface 206 includes three force-based operating modes (an M6 operating mode, an M8 operating mode, and an M10 operating mode) and a distance-based operating mode. Selection of the mode selection input 210 changes which operating mode is selected. For example, the mode selection input 210 may be a button configured to receive user input. Each time the mode selection input 210 is pressed, the operation mode interface 206 cycles through which operating mode is selected. In some embodiments, the operation mode interface 206 includes a plurality of indicators 214, each associated with an operating mode. The plurality of indicators 214 provide a visual indication of which operating mode is selected. The plurality of indicators 214 may be, for example, light-emitting diodes (LEDs), a display screen, or the like.

Each of the force-based operating modes correspond to a specific force needed to secure the rivet nut 138 of the specified size. For example, the M6 operating mode drives the output shaft 18 to secure an M6 rivet nut. The M8 operating mode drives the output shaft 18 to secure an M8 rivet nut. The M10 operating mode drives the output shaft 18 to secure an M10 rivet nut. Other force-based operating modes may also be provided. The distance interface 202 includes a display that provides a distance the output shaft 18 is configured to travel when in the distance operating mode. In the illustrated embodiment, the distance interface 202 includes a ruler 218 and a distance indicator 222. The distance indicator 222 aligns with a notch on the ruler 218 to indicate how far the output shaft 18 is set to travel. Each notch on the ruler 218 may indicate, for example, one millimeter (mm) of distance.

Figure 16:
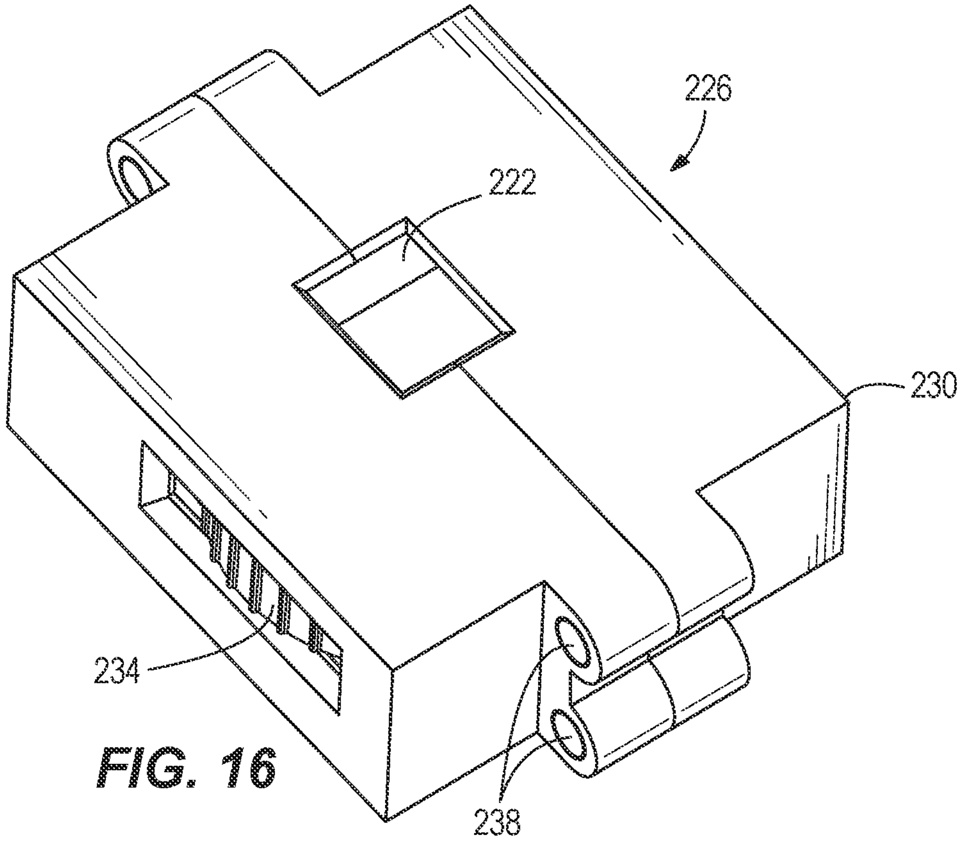
FIG. 16 is a view of a setting dial in accordance with an embodiment described herein.
Figure 17:
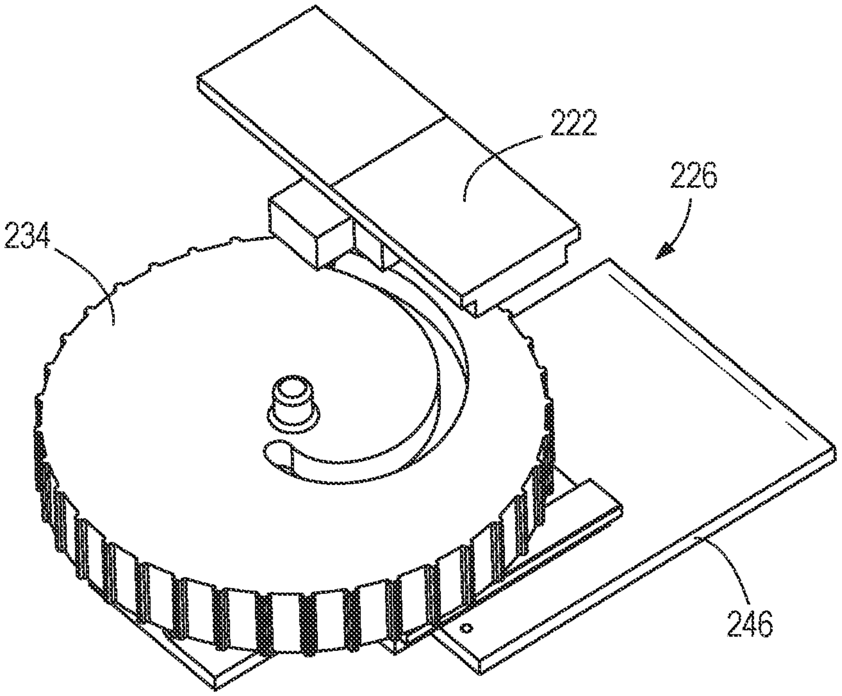
FIG. 17 is a view of the setting dial of FIG. 16 with a dial housing removed in accordance with an embodiment described herein.

With reference to FIGS. 16-17, the distance set for the distance-based operating mode is adjusted using a distance setting device 226. The distance setting device 226 includes a potentiometer housing 230, a dial 234, fastening holes 238, and a PCB 246 (FIG. 17). The dial 234, the distance indicator 222, and the PCB 246 may be stored within the potentiometer housing 230. In some embodiments, the potentiometer housing 230 couples to the housing 14 via a fastener and the fastening holes 238. In an alternative embodiment, the potentiometer housing 230 may be integrated within the housing 14.

Rotation of the dial 234 alters the voltage reading of the potentiometer in the potentiometer housing 230 and changes the position of the distance indicator 222. The further the dial 234 is rotated, the value of the distance indicator 222, and therefore the distance traveled by the output shaft 18, increases based on the voltage reading from the potentiometer to the PCB 246. In some embodiments, the voltage reading of the potentiometer and the value of the distance indicator 222 may be negatively correlated such that the value of the distance indicator 222, and therefore the distance traveled by the output shaft 18, decreases based on the voltage reading from the potentiometer to the PCB 246. The distance setting device 226 may be coupled to the distance interface 202 via the controller 300 (shown in FIG. 18), as described in more detail below. In some embodiments, rather than the dial 234, the distance setting device 226 is another type of input, such as a slider, a push-button, a touch-screen, or the like that allows a user to adjust the distance set for the distance-based operating mode.

Figure 18:
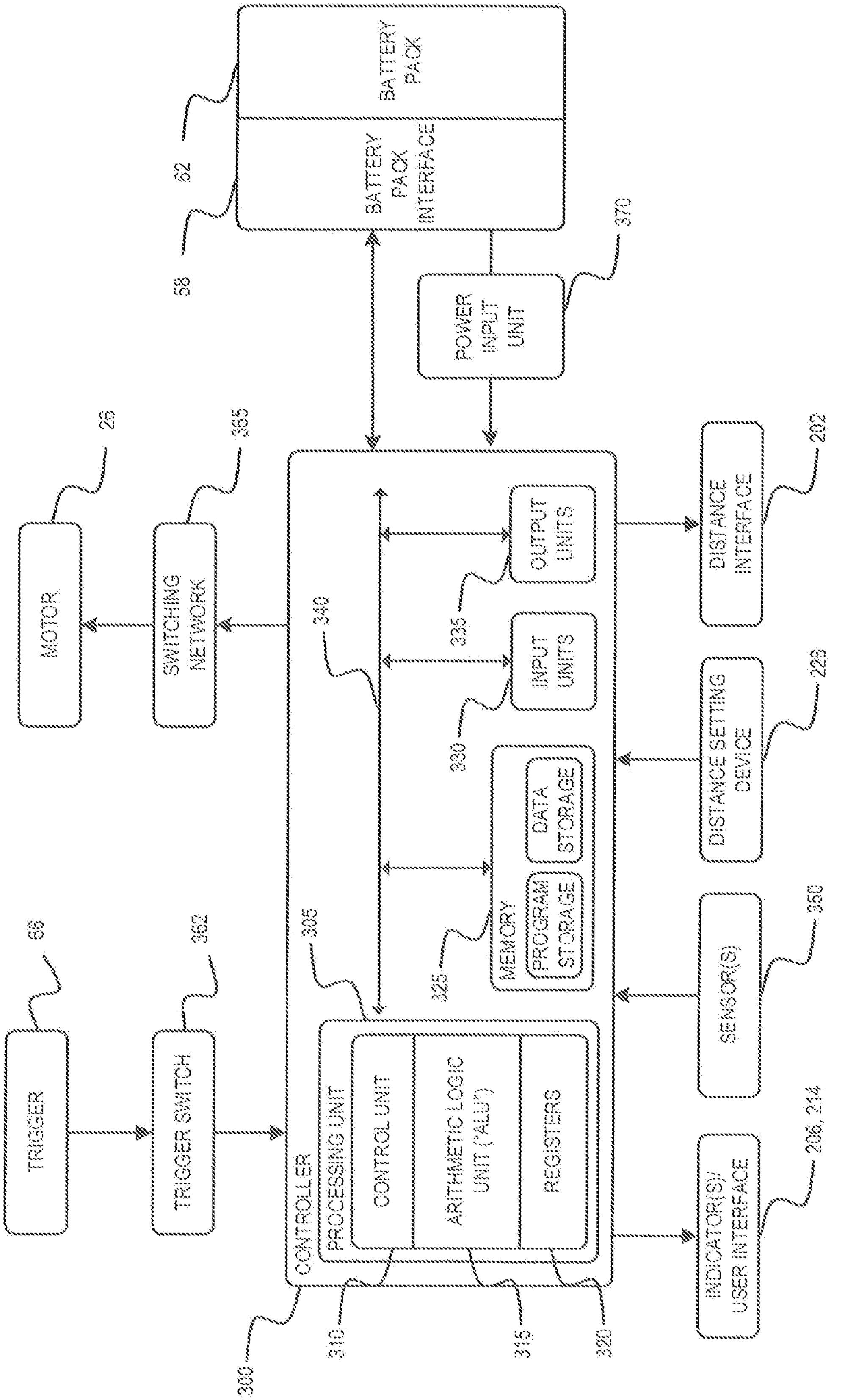
FIG. 18 is a block diagram of a controller of the power tool in accordance with an embodiment described herein.

The controller 300 for the rivet nut-setting tool 10 is illustrated in FIG. 18. The controller 300 is electrically and/or communicatively connected to a variety of modules or components of the rivet nut-setting tool 10. For example, the illustrated controller 300 is connected to user interface/indicators 206, 214, one or more sensors 350 (e.g., a speed sensor, a voltage sensor, current sensor, a temperature sensor, an accelerometer, a proximity sensor, Hall effect sensors, a position sensor, etc.), the distance setting device 226, the distance interface 202, a trigger switch 362 coupled to the trigger 66, a switching network 365, the battery pack interface 58, and a power input unit 370.

The controller 300 includes a plurality of electrical and electronic components that provide power, operational control, and protection to the components and modules within the controller 300 and/or the rivet nut-setting tool 10. For example, the controller 300 includes, among other things, a processing unit 305 (e.g., a microprocessor, an electronic processor, an electronic controller, a microcontroller, or another suitable programmable device), a memory 325, input units 330, and output units 335. The processing unit 305 includes, among other things, a control unit 310, an arithmetic logic unit ("ALU") 315, and a plurality of registers 320 (shown as a group of registers in FIG. 18), and is implemented using a known computer architecture (e.g., a modified Harvard architecture, a von Neumann architecture, etc.). The processing unit 305, the memory 325, the input units 330, and the output units 335, as well as the various modules connected to the controller 300 are connected by one or more control and/or data buses (e.g., common bus 340). The control and/or data buses are shown generally in FIG. 18 for illustrative purposes. The use of one or more control and/or data buses for the interconnection between and communication among the various modules and components would be known to a person skilled in the art in view of the embodiments described herein.

The memory 325 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 305 is connected to the memory 325 and executes software instructions that are capable of being stored in a RAM of the memory 325 (e.g., during execution), a ROM of the memory 325 (e.g., on a generally permanent basis), or another non-transitory computer readable medium such as another memory or a disc. Software included in the implementation of the rivet nut-setting tool 10 can be stored in the memory 325 of the controller 300. The software includes, for example, firmware, one or more applications, program data, filters, rules, one or more program modules, and other executable instructions. The controller 300 is configured to retrieve from the memory 325 and execute, among other things, instructions related to the control processes and methods described herein. In other embodiments, the controller 300 includes additional, fewer, or different components.

Figure 19A:
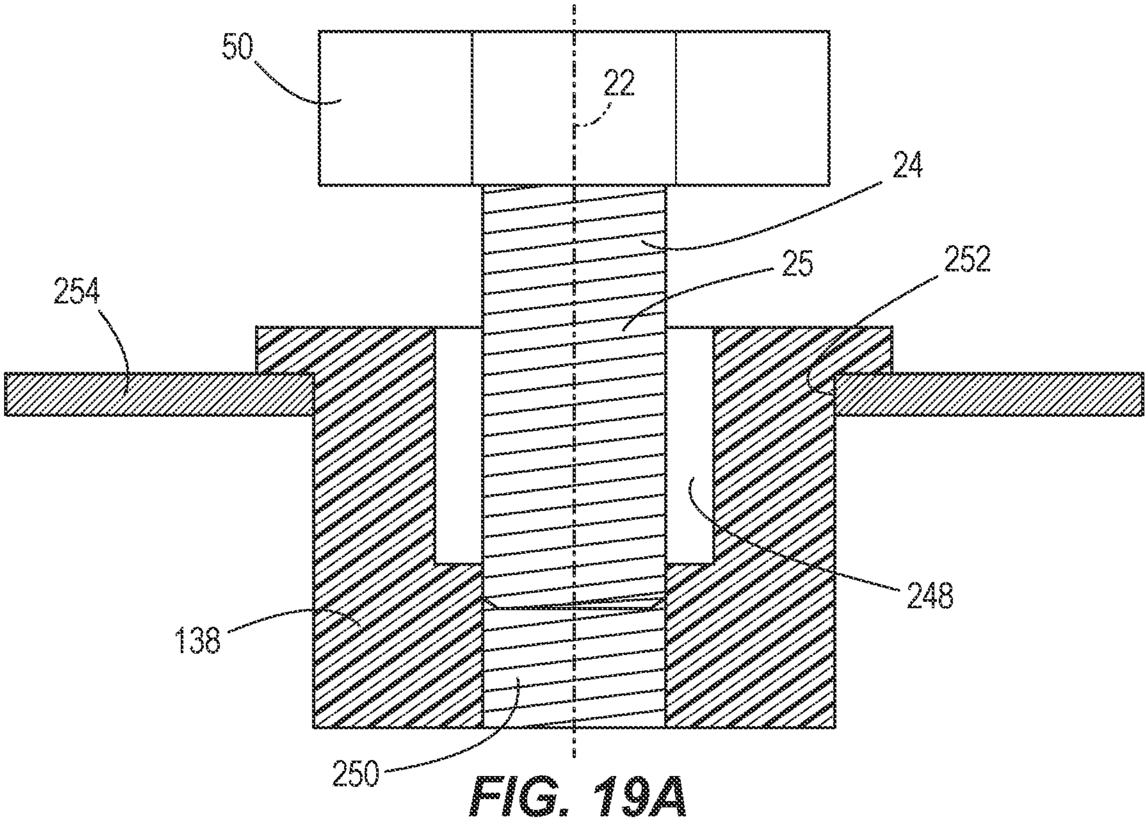
FIG. 19A is a cross-sectional view of the pull stud of the blind rivet nut-setting tool of FIG. 1 with a blind rivet nut partially threaded onto the pull stud, and the blind rivet nut inserted through an aperture in a workpiece.
Figure 19B:
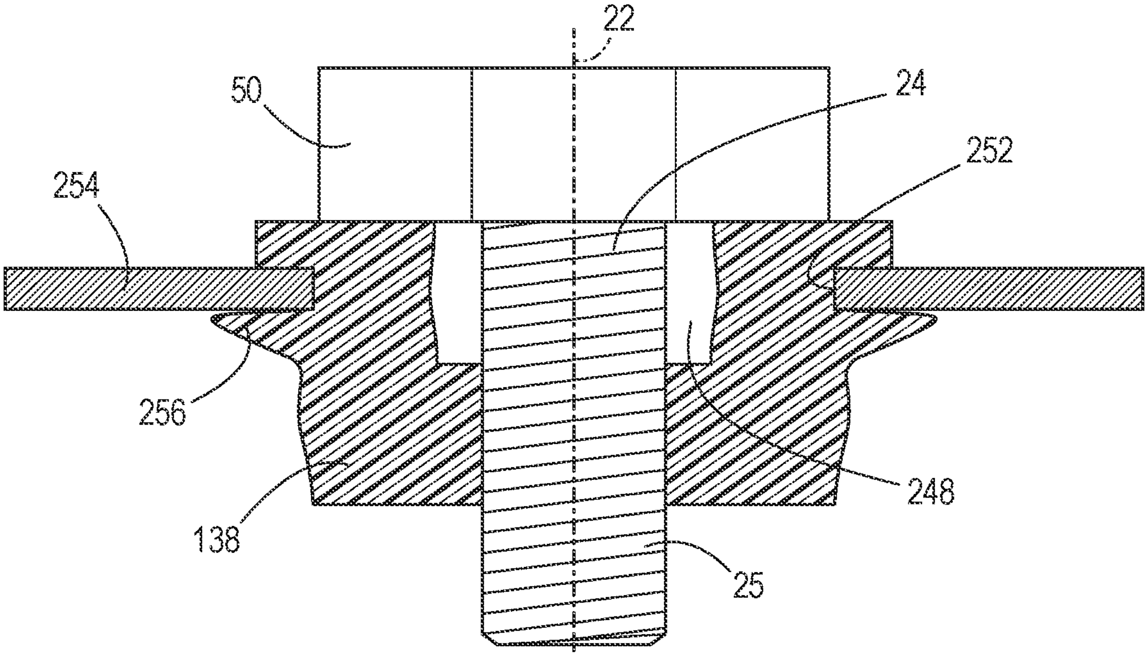
FIG. 19B is a cross-sectional view of the pull stud of the blind rivet nut-setting tool of FIG. 1 performing a crushing stroke on the blind rivet nut.

Prior to a detailed discussion of the specific operation of the blind rivet nut-setting tool 10, very generally, a user first inserts the pull stud 24 through an unthreaded portion 248 (as shown in FIG. 19A) of the rivet nut 138 and then actuates the trigger 66 to mesh the threads 25 of the pull stud 24 to the threaded portion 250 of the rivet nut 138 until the anvil 50 abuts the rivet nut 138. When the rivet nut 138 is positioned within a hole 252 of a workpiece 254, the tool 10 initiates a crushing stroke. During the crushing stroke, the motor 26 drives the ball screw 186, which rearwardly pulls the pull stud 24 along the drive axis 22. The pull stud 24 does not rotate during this time. Pulling the pull stud 24 sets the blind rivet nut 138 by deforming a portion 256 of the blind rivet nut 138 against the workpiece 254, as shown in FIG. 19B. Subsequently, the operator may reverse the motor 26 where the pull stud 24 is unthreaded from the rivet nut 138 and the tool 10 is ready for a subsequent setting operation.

More Specifically, in operation, the controller 300 drives the motor 26 to actuate the output shaft 18 in response to a user's actuation of the trigger 66. Depression of the trigger 66 actuates the trigger switch 362, which outputs a signal to the controller 300 to activate the motor 26. The controller 300 controls a switching network 365 (e.g., a FET switching bridge), which may then actuate the pull stud 24 and/or the output shaft 18 via the pull mechanism 166. When the trigger 66 is released, the trigger switch 362 no longer outputs the actuation signal (or outputs a released signal) to the controller 300. The controller 300 may cease actuation of the pull stud 24 and/or the output shaft 18 when the trigger 66 is released by controlling the switching network 365 to deactivate the motor 26. In some embodiments, the controller 300 continues to actuate pull stud 24 and/or the output shaft 18 to achieve either the desired distance or the desired force based on the selected operating mode after the trigger 66 is released.

In some embodiments, the one or more sensors 350 include Hall-effect sensors (or other position sensors) to detect one or more of the rotational position, velocity, and acceleration of the motor 26. For example, the Hall-effect sensors detect a position of a rotor 242 of the motor 26, or a position of the drive shaft 30 since the drive shaft 30 is coupled to the rotor for co-rotation therewith, or a specific phase of the motor 26. In some embodiments, sensorless motor control is employed and Hall-effect sensors are not needed to detect the rotational position, velocity, and/or acceleration of the motor 26. Additionally, the one or more sensors 350 may include current sensors and/or voltage sensors that provide the controller 300 with information regarding operation of the motor 26, such as the current of the motor 26 and the phase voltage of the motor 26.

The battery pack interface 58 is connected to the controller 300 and couples to the battery pack 62. The battery pack interface 58 includes a combination of mechanical (e.g., a battery pack receiving portion) and electrical components configured to and operable for interfacing (e.g., mechanically, electrically, and communicatively connecting) the rivet nut-setting tool 10 with the battery pack 62. The battery pack interface 58 is coupled to the power input unit 370. The battery pack interface 58 transmits the power received from the battery pack 62 to the power input unit 370. The power input unit 370 includes active and/or passive components (e.g., voltage step-down controllers, voltage converters, rectifiers, filters, etc.) to regulate or control the power received through the battery pack interface 58 and to the controller 300.

Figure 20:
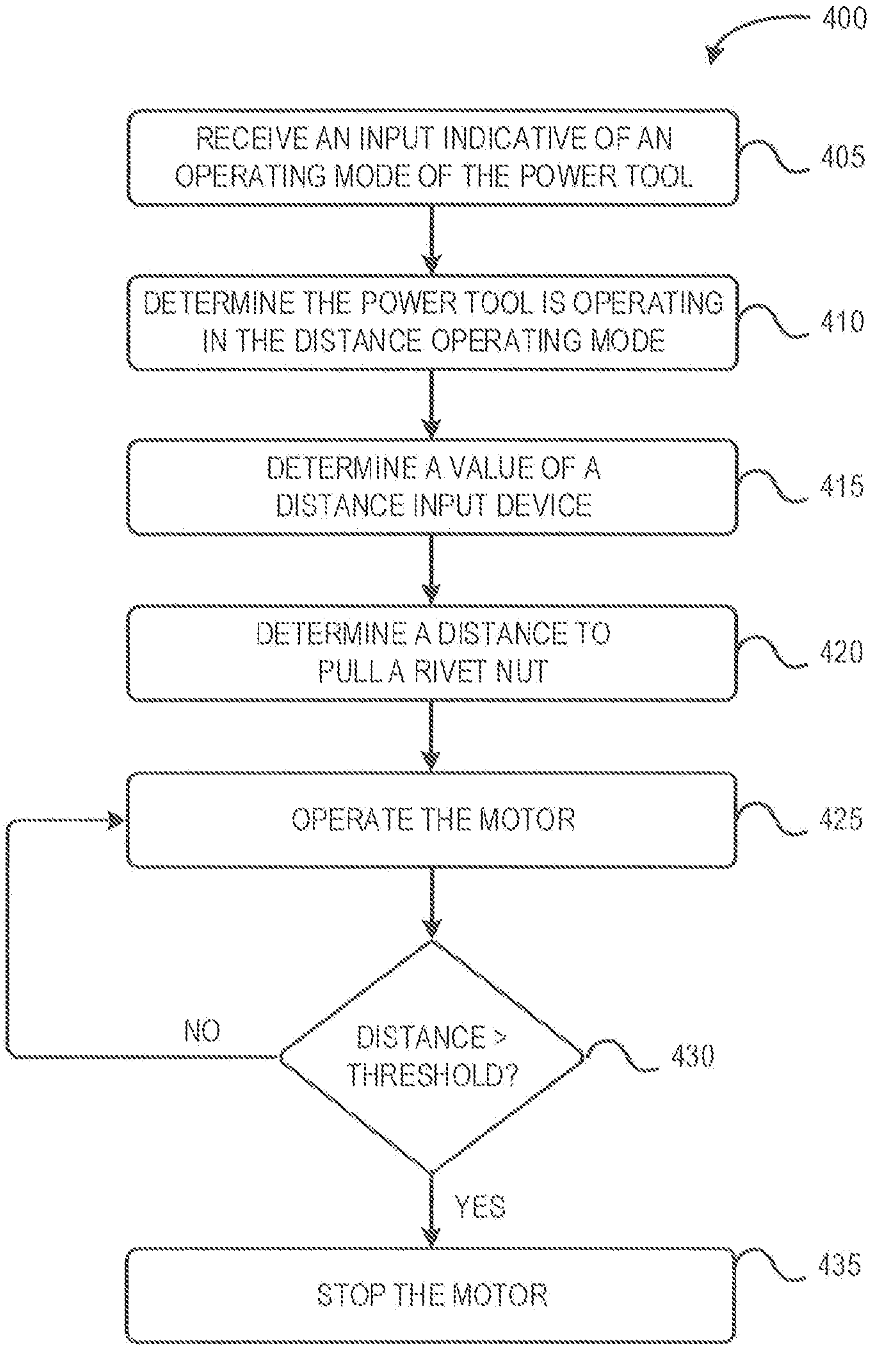
FIG. 20 is a block diagram of a method performed by the controller of FIG. 18 in accordance with an embodiment described herein.

Operation of the rivet nut-setting tool 10 may vary based on which operating mode is selected. For example, FIG. 20 provides a method 400 for operating the rivet nut-setting tool 10 according to the distance-based operating mode. The method 400 may be performed by the electronic processor 300. At block 405, the method 400 includes receiving an input indicative of an operating mode of the rivet nut-setting tool 10. The input may be, for example, pressing of the mode selection input 210. At block 410, the method 400 includes determining the rivet nut-setting tool 10 is operating in the distance-based operating mode.

At block 415, the method 400 includes determining a value of the distance input device 226. For example, the controller 300 may determine the voltage reading of the potentiometer as the dial 234 rotates. That said, the voltage reading corresponds to a position of the dial 234, and therefore corresponds to a desired distance. At block 420, the method 400 includes determining the distance to pull the rivet nut 138. For example, the controller 300 may compare the voltage reading of the potentiometer to a table stored in the memory 325 to determine a pull distance.

At block 425, the method 400 includes operating the motor 26, as previously described. At block 430, the method 400 includes comparing the distance pull stud 24 and/or output shaft 18 has traveled to a threshold. For example, the controller 300 may equate the pull distance with a number of rotations of the motor 26. The controller 300 receives position information regarding the motor 26 from the Hall-effect sensors and monitors the number of rotations of the motor 26 based on the changing position of the motor 26. If the distance the pull stud 24 and/or output shaft 18 has travelled is greater than or equal to the threshold (for example, the number of rotations of the motor 26 reaching a threshold), the method 400 proceeds to block 435 and stops the motor 26. If the distance the output shaft 18 has travelled is less than the threshold, the method 400 returns to block 425 and continues to operate the motor 26. In some embodiments, rather than stopping the motor 26 at block 435, the controller 300 reverses the motor 26 to release the rivet nut 138 (e.g., automatically reverses the motor 26).

Figure 21:
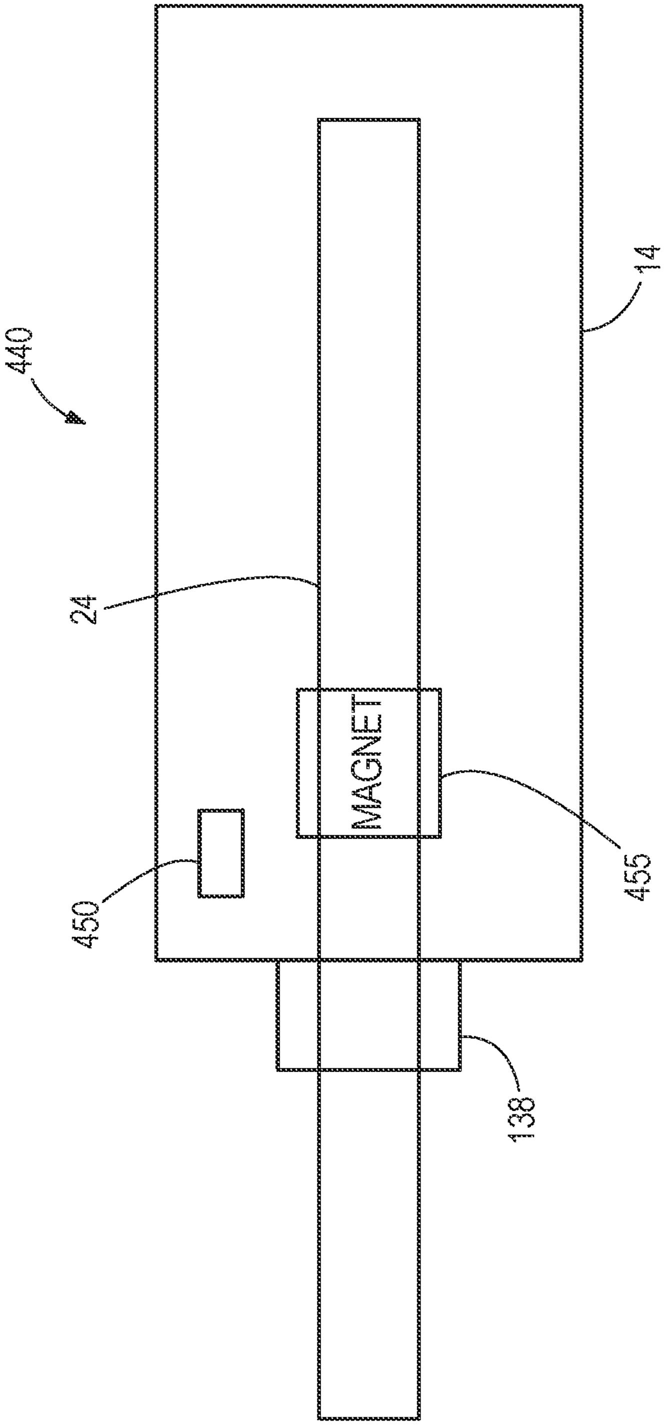
FIG. 21 is a schematic view of a sensing system of the power tool in accordance with an embodiment described herein.

In some embodiments, the controller 300 may only monitor a position of the pull stud 24. For example, FIG. 21 provides a sensing system 440 of the rivet nut-setting tool 10. The sensing system 440 includes a Hall-effect sensor 450 (or some other position sensor) and a magnet 455 coupled to the pull stud 24. Prior to the crushing stroke, the controller 300 monitors the position of the pull stud 24. Once the pull stud 24 is in a starting (or home) position, the Hall-effect sensor 450 detects the position of the magnet 455. The controller 300 then begins to monitor the number of rotations of the motor 26 as the output shaft 18 is operated, as described with respect to block 430.

Figure 22:
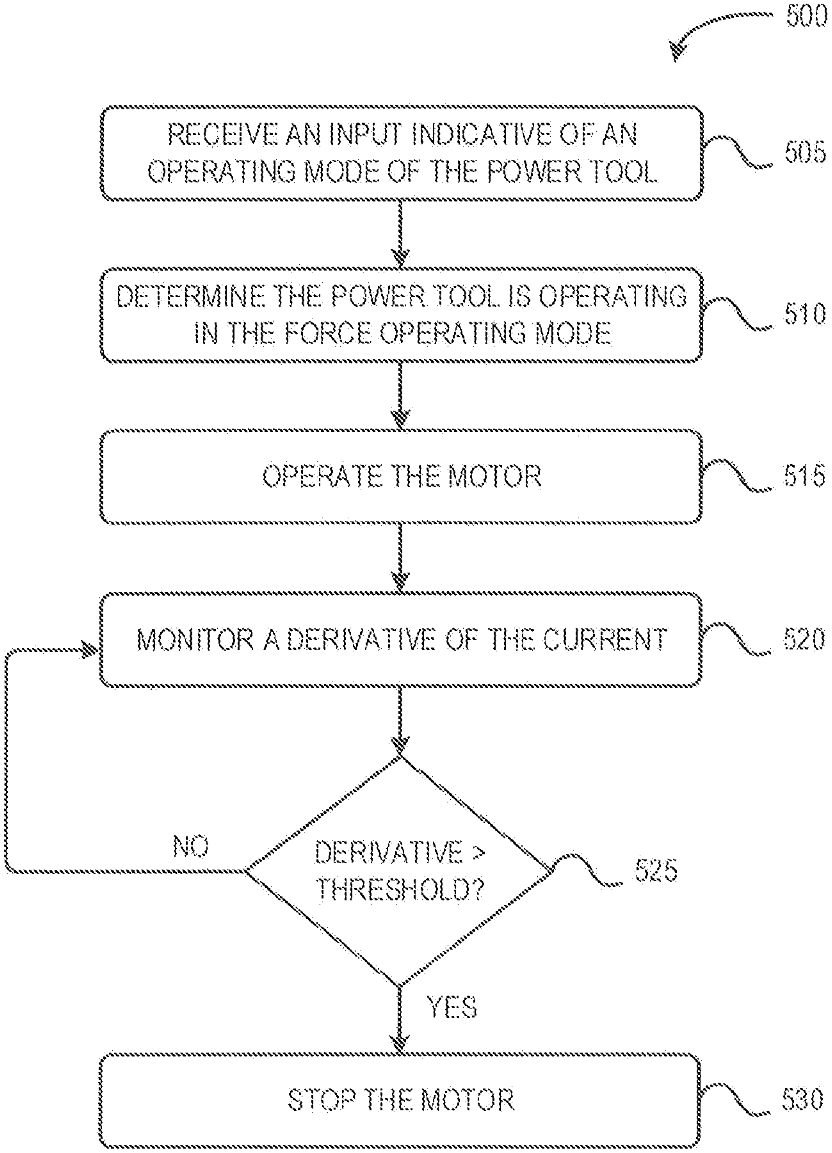
FIG. 22 is a block diagram of a method performed by the controller of FIG. 18 in accordance with an embodiment described herein.

FIG. 22 provides a method 500 for operating the rivet nut-setting tool 10 according to the force-based operating mode. The method 500 may be performed by the controller 300. At block 505, the method 500 includes receiving an input indicative of an operating mode of the rivet nut-setting tool 10. The input may be, for example, pressing of the mode selection input 210. At block 510, the method includes determining the rivet nut-setting tool 10 is operating in the force-based operating mode. In some embodiments, the controller 300 determines which force-based operating mode the rivet nut-setting tool 10 is operating in (e.g., the M6 operating mode, the M8 operating mode, or the M10 operating mode).

Figure 23:
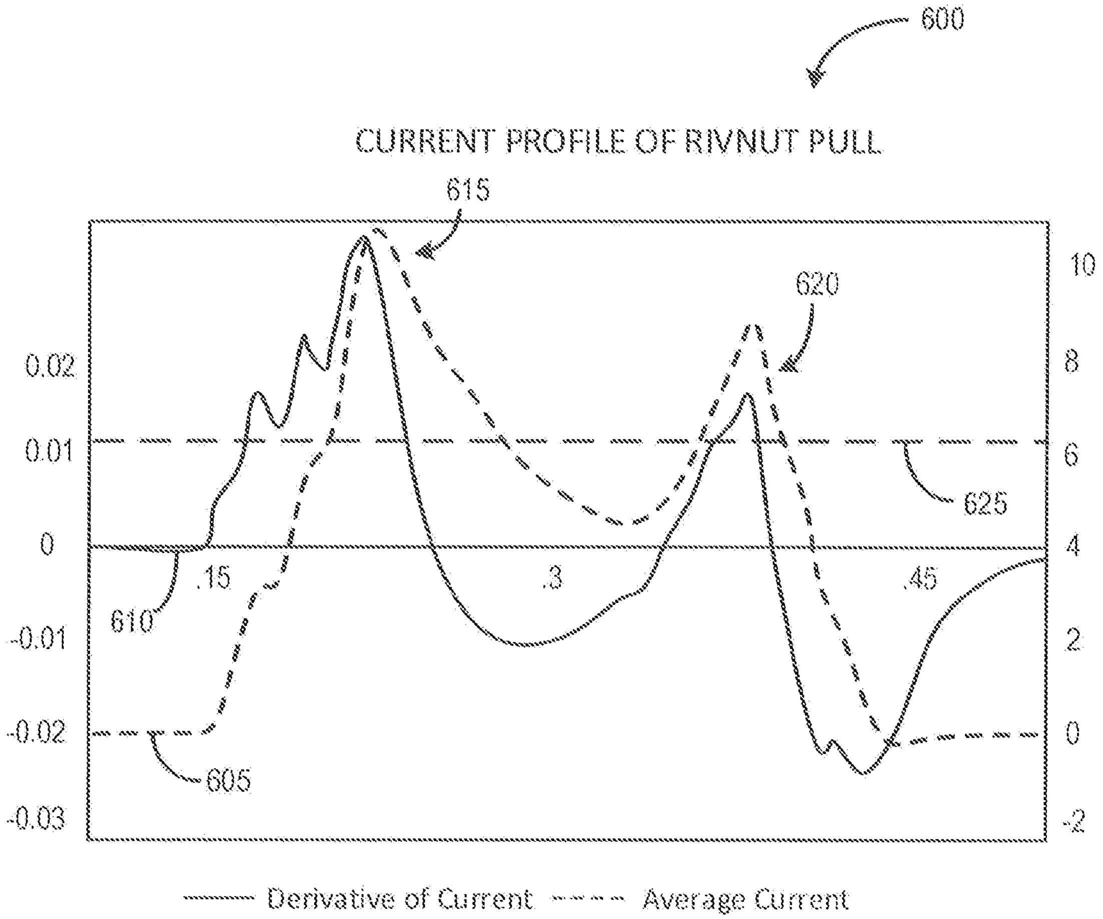
FIG. 23 is a graph of a current profile in accordance with an embodiment described herein.

At block 515, the method 500 includes operating the motor 26, as previously described. At block 520, the method 500 includes monitoring a derivative of the motor current. For example, FIG. 23 provides a graph 600 illustrating an average current 605 of the motor 26 and a derivative 610 of the average current 605. The current may be provided to the controller 300 by a current sensor included in the plurality of sensors 350. While the motor 26 operates to drive the output shaft 18, the current may increase as resistance from deforming the rivet nut 138 increases. Accordingly, an increase in current indicates a greater force applied to the rivet nut 138. In some embodiments, motor current is monitored without monitoring the derivative of the motor current.

At block 525, the method 500 includes comparing the derivative 610 of the average current 605 to a threshold. If the derivative 610 is below the threshold, the method 500 returns to block 515 and continues to operate the motor 26. If the derivative 610 is above the threshold, the method 500 proceeds to block 530 and stops the motor 26. Each force-based operating mode may have its own threshold, as different sized rivet nuts may require a different amount of force to deform and secure the rivet nut 138. Additionally, larger sized rivet nuts 138 may have a large initial pull, resulting in a high initial inrush current (shown as first peak 615 in FIG. 23). Accordingly, the controller 300 may ignore the derivative 610 for a predetermined amount of time prior to comparing the derivative 610 to the threshold. In some embodiments, the controller 300 begins comparing the derivative 610 to the threshold after the initial inrush current, and once the derivative 610 exceeds the threshold (shown as second peak 620 exceeding threshold 625 in FIG. 23), the controller 300 proceeds to block 530 and stops the motor 26. In some embodiments, rather than stopping the motor 26 at block 530, the controller 300 reverses the motor 26 to release the rivet nut 138 (e.g., automatically reverses the motor 26).

In some embodiments, actuation of the trigger 66 causes the pull stud 24 to thread onto the rivet nut 138. Thereafter, the rivet nut 138 begins to crush and the derivative 610 greatly increases (shown as first peak 615 in FIG. 23) and, in response, the rivet nut-setting tool 10 stops the motor 26. In some embodiments, the controller 300 monitors both the derivative 610 and a speed of the motor 26 to determine when the rivet nut 138 begins to crush. A second actuation of the trigger 66 causes the rivet nut-setting tool 10 to begin a pulling process to set the rivet nut 138. As described above with respect to blocks 520-530, as the rivet nut 138 is set, the controller 300 monitors the derivative 610 to determine when to shut off the motor 26. In some embodiments, if no rivet nut 138 is detected during the initial actuation of the trigger 66 to spin the rivet nut 138 using the pull stud 24, the controller 300 reverses the motor 26 to return the pull stud 24 to the home position (e.g., automatically reverses the motor 26).

In some embodiments, the controller 300 monitors the power level of the battery pack 62 (or voltage level, remaining battery pack capacity, etc.) to determine whether the battery pack 62 has enough power to perform the desired operation. For example, the controller 300 may compare the power level of the battery pack 62 to a threshold, such as a power threshold. If the power level of the battery pack 62 is below the power threshold, the controller 300 will not perform the desired operation. In some embodiments, the controller 300 may output a signal that the power level of the battery pack 62 is too low (for example, using the plurality of indicators 214 or the distance interface 202). If the power level of the battery pack 62 is above the power threshold, the controller 300 proceeds to perform the desired operation. The power level threshold may be set and/or altered based on a user setting or mode setting, such as via the dual ring input 194 or a component of the user interface module 190.

Various features and advantages of the invention are set forth in the following claims.

What is claimed is:

1. A blind rivet nut-setting tool for setting a rivet nut, the tool comprising:

a housing having an anvil;

a pull stud extending from the anvil and capable of engaging the rivet nut;

an output shaft defining a drive axis;

a motor having a drive shaft defining a motor axis that is parallel to the drive axis, the motor is configured to transfer torque to the output shaft to rotate the pull stud about the drive axis;

a clutch mechanism that is disposed between the motor and the output shaft, the clutch mechanism being moveable between an engaged state, in which torque from the motor is transferred to the output shaft when a reaction torque exerted on the pull stud is below a predefined torque threshold, and a disengaged state, in which torque from the motor is not transferred to the output shaft when a reaction torque exerted on the pull stud is equal to or above a predefined torque threshold;

a transmission that is disposed between the motor and the clutch mechanism for decreasing rotational speed of the output shaft relative to the drive shaft, wherein the transmission is closer to the pull stud than the clutch mechanism is to the pull stud; and a pull mechanism that is driven by the motor and capable of translating the pull stud along the drive axis.

2. The tool of claim 1, wherein a length in which the pull stud extends from the anvil changes when the pull mechanism translates the pull stud along the drive axis.

3. The tool of claim 2, wherein the pull mechanism decreases the length of the pull stud extending from the anvil simultaneously when the clutch mechanism is in the disengaged state.

4. The tool of claim 2, further comprising a planetary transmission configured to transmit torque from the motor to a collar of the pull mechanism, which circumferentially engages a ball screw of the pull mechanism.

5. The tool of claim 4, wherein the ball screw translates along the drive axis when the collar is rotated by the motor which, in turn, imparts axial movement of the pull stud along the drive axis.

6. The tool of claim 5, further comprising a Hall-effect sensor disposed within the housing to determine when a number of rotations of the drive shaft reaches a rotation threshold corresponding to the length in which the pull stud extends from the anvil reaching a desired position, at which point the motor is deactivated.

7. The tool of claim 1, wherein the clutch mechanism is a slip plate clutch including a slip plate, a clutch sleeve, and a plurality of balls between the slip plate and the clutch sleeve, and wherein the slip plate is coupled to the motor and the clutch sleeve is coupled to the output shaft.

8. The tool of claim 7, wherein the plurality of balls jam against a plurality of ramps of the slip plate in the engaged state to cause co-rotation of the slip plate and the clutch sleeve, and wherein the plurality of balls slide past the ramps of the slip plate in the disengaged state to cause relative rotation between the slip plate and the clutch sleeve.

9. The tool of claim 8, wherein the ramps include a gradual slope section and a steep slope section, wherein the plurality of balls interact with the gradual slope section when the motor is activated in a forward direction, and wherein the plurality of balls interact with the steep slope section when the motor is activated in a reverse direction to inhibit the clutch mechanism transitioning to the disengaged state.

10. The tool of claim 1, wherein the clutch mechanism includes a clutch bypass that enables a user to manually rotate the pull stud.

11. The tool of claim 1, further comprising:

a trigger for activating the motor; and a potentiometer configured to output a voltage signal for adjusting a crushing stroke of the output shaft along the drive axis, wherein the clutch mechanism is capable of disengaging when the motor is driven in a forward direction in response to a first reaction torque being exerted on the pull stud, such that the drive shaft is capable of rotating relative to the output shaft in response to the rivet nut being seated against the anvil, and wherein the clutch mechanism is engaged when the motor is driven in a reverse direction to unthread the pull stud from the rivet nut until a second reaction torque is exerted on the pull stud that is greater than the first reaction torque.

12. The tool of claim 11, wherein the pull mechanism is driven by the motor and capable of translating the pull stud along the drive axis during the crushing stroke.

13. The tool of claim 12, wherein a length in which the pull stud extends from the anvil changes when the pull mechanism translates the pull stud along the drive axis.

14. The tool of claim 13, wherein the pull mechanism simultaneously decreases the length of the pull stud extending from the anvil as the clutch mechanism is disengaged.

15. The tool of claim 13, further comprising a planetary transmission configured to transmit torque from the motor to a collar of the pull mechanism, which circumferentially engages a ball screw of the pull mechanism.

16. The tool of claim 15, wherein the ball screw translates along the drive axis when the collar is rotated by the motor which, in turn, imparts axial movement of the pull stud along the drive axis.

17. The tool of claim 16, further comprising a Hall-effect sensor disposed within the housing to determine when a number of rotations of the drive shaft reaches a rotation threshold corresponding to the length in which the pull stud extends from the anvil reaching a desired position, at which point the motor is deactivated.

18. The tool of claim 11, wherein the clutch mechanism is a slip plate clutch including a slip plate, a clutch sleeve, and a plurality of balls between the slip plate and the clutch sleeve, and wherein the slip plate is coupled to the motor and the clutch sleeve is coupled to the output shaft.

19. The tool of claim 18, wherein the plurality of balls jam against a plurality of ramps of the slip plate when the clutch mechanism is engaged to cause co-rotation of the slip plate and the clutch sleeve, and wherein the plurality of balls slide past the ramps of the slip plate when the clutch mechanism is disengaging to cause relative rotation between the slip plate and the clutch sleeve.

20. The tool of claim 19, wherein the ramps include a gradual slope section and a steep slope section, wherein the plurality of balls interact with the gradual slope section when the motor is activated in the forward direction, and wherein the plurality of balls interact with the steep slope section when the motor is activated in a reverse direction to inhibit the clutch mechanism from disengaging.

21. The tool of claim 11, wherein the clutch mechanism includes a clutch bypass that enables a user to manually rotate the pull stud.

22. The tool of claim 11, further comprising a distance indicator on the housing, wherein the potentiometer changes a position of the distance indicator based on the voltage signal.

23. The tool of claim 11, further comprising an electronic controller within the housing and in communication with the potentiometer to receive the voltage signal therefrom, wherein the electronic controller is configured to determine the crushing stroke of the output shaft based on the voltage signal.

* * * * *